US009341760B2

(12) United States Patent
Kurashige

(10) Patent No.: US 9,341,760 B2
(45) Date of Patent: *May 17, 2016

(54) ILLUMINATING METHOD USING COHERENT LIGHT SOURCE

(71) Applicant: DAI NIPPON PRINTING CO., LTD., Tokyo (JP)

(72) Inventor: Makio Kurashige, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/455,383

(22) Filed: Aug. 8, 2014

(65) Prior Publication Data

US 2014/0347715 A1    Nov. 27, 2014

Related U.S. Application Data

(62) Division of application No. 13/704,405, filed as application No. PCT/JP2010/065692 on Sep. 7, 2010, now Pat. No. 8,848,267.

(51) Int. Cl.
   *G02B 5/32* (2006.01)
   *G02B 5/02* (2006.01)
   (Continued)

(52) U.S. Cl.
   CPC . *G02B 5/32* (2013.01); *F21V 5/004* (2013.01); *F21V 14/00* (2013.01); *G02B 5/0252* (2013.01); *G02B 27/48* (2013.01); *G03B 21/208* (2013.01); *G03B 21/2033* (2013.01);
   (Continued)

(58) Field of Classification Search
   None
   See application file for complete search history.

(56) References Cited

U.S. PATENT DOCUMENTS 4,299,437 A    11/1981   Ono
4,416,505 A    11/1983   Dickson
(Continued)

FOREIGN PATENT DOCUMENTS

CN    101203802 A    6/2008
CN    101233443 A    7/2008
(Continued)

OTHER PUBLICATIONS

English Machine Translation of Nishihara, JP 2000-019641 A.*
(Continued)

*Primary Examiner* — Derek S Chapel
(74) *Attorney, Agent, or Firm* — Ladas & Parry LLP

(57) ABSTRACT

A laser beam (L50) generated by a laser light source (50) is reflected by a light beam scanning device (60), and irradiated onto a hologram recording medium (45). On the hologram recording medium (45), an image (35) of a scatter plate is recorded as a hologram by using reference light that converges on a scanning origin (B). The light beam scanning device (60) bends the laser beam (L50) at the scanning origin (B) and irradiates it onto the hologram recording medium (45). At this time, scanning is carried out by changing the bending mode of the laser beam with time so that the irradiation position of the bent laser beam (L60) on the hologram recording medium (45) changes with time. Regardless of the beam irradiation position, diffracted light (L45) from the hologram recording medium (45) reproduces the same reproduction image (35) of the scatter plate at the same position. An illumination spot in which speckles are reduced is formed on the light receiving surface (R) of an illuminating object (70) by the reproduction image (35) of the hologram.

9 Claims, 19 Drawing Sheets

(51) Int. Cl.
G03H 1/22 (2006.01)
G03H 1/32 (2006.01)
G02B 27/48 (2006.01)
G03B 21/20 (2006.01)
G03B 33/06 (2006.01)
H04N 9/31 (2006.01)
G03H 1/02 (2006.01)
G03H 1/04 (2006.01)
F21V 5/00 (2015.01)
F21V 14/00 (2006.01)
G03H 1/00 (2006.01)
G03H 1/26 (2006.01)
F21Y 101/00 (2016.01)

(52) U.S. Cl.
CPC ................ G03B 33/06 (2013.01); G03H 1/02 (2013.01); G03H 1/0402 (2013.01); G03H 1/22 (2013.01); G03H 1/2286 (2013.01); G03H 1/32 (2013.01); H04N 9/3129 (2013.01); F21Y 2101/00 (2013.01); G03H 1/0005 (2013.01); G03H 2001/0204 (2013.01); G03H 2001/0216 (2013.01); G03H 2001/0428 (2013.01); G03H 2001/0439 (2013.01); G03H 2001/262 (2013.01); G03H 2222/36 (2013.01)

(56) References Cited

U.S. PATENT DOCUMENTS

| 4,790,612 | A | 12/1988 | Dickson |
| 5,737,084 | A | 4/1998 | Ishihara |
| 5,946,100 | A | 8/1999 | Ishihara |
| 6,008,914 | A | 12/1999 | Sasagawa et al. |
| 6,108,090 | A | 8/2000 | Ishihara |
| 6,373,978 | B1 | 4/2002 | Ishihara |
| 7,515,319 | B2* | 4/2009 | Adibi et al. ............. 359/19 |
| 8,016,428 | B2 | 9/2011 | Kasazumi et al. |
| 8,025,410 | B2 | 9/2011 | Chen |
| 8,350,789 | B2 | 1/2013 | Furuya et al. |
| 8,727,543 | B2* | 5/2014 | Kurashige et al. ............. 353/98 |
| 2003/0052252 | A1 | 3/2003 | Sugiyama et al. |
| 2004/0150837 | A1 | 8/2004 | Sugiyama |
| 2005/0030489 | A1 | 2/2005 | Togino |
| 2005/0173618 | A1 | 8/2005 | Sugiyama et al. |
| 2005/0174612 | A1 | 8/2005 | Sugiyama et al. |
| 2005/0189417 | A1 | 9/2005 | Dickson et al. |
| 2006/0255243 | A1 | 11/2006 | Kobayashi et al. |
| 2007/0058143 | A1 | 3/2007 | Penn et al. |
| 2007/0273848 | A1 | 11/2007 | Fan et al. |
| 2009/0040467 | A1 | 2/2009 | Yamauchi et al. |
| 2009/0168134 | A1 | 7/2009 | Nojima |
| 2009/0168424 | A1 | 7/2009 | Yamauchi et al. |
| 2010/0020291 | A1 | 1/2010 | Kasazumi et al. |
| 2010/0053565 | A1 | 3/2010 | Mizushima et al. |
| 2010/0165307 | A1 | 7/2010 | Mizushima et al. |
| 2011/0043876 | A1* | 2/2011 | Kurashige et al. ............. 359/15 |
| 2013/0076857 | A1 | 3/2013 | Kurashige et al. |
| 2013/0077057 | A1 | 3/2013 | Kurashige et al. |
| 2013/0088763 | A1 | 4/2013 | Kurashige |
| 2014/0177018 | A1 | 6/2014 | Kurashige et al. |

FOREIGN PATENT DOCUMENTS

| CN | 101276062 A | 10/2008 |
| CN | 101363967 A | 2/2009 |
| EP | 1 976 303 A1 | 10/2008 |
| EP | 2 128 694 A1 | 2/2009 |
| EP | 2 128 694 A1 | 12/2009 |
| GB | 2 456 170 A | 7/2009 |
| JP | 61-50003 A | 3/1986 |
| JP | 61-260108 A | 11/1986 |
| JP | 6-208089 A | 6/1994 |
| JP | 7-77924 A | 3/1995 |
| JP | 9-257440 A | 10/1997 |
| JP | 11-174377 A | 7/1999 |
| JP | 2000-19641 A | 1/2000 |
| JP | 2002-165231 A | 6/2002 |
| JP | 2003-15079 A | 1/2003 |
| JP | 2004-38012 A | 2/2004 |
| JP | 2004-144936 A | 5/2004 |
| JP | 2004-233177 A | 8/2004 |
| JP | 2004-264512 A | 9/2004 |
| JP | 2005-62012 A | 3/2005 |
| JP | 2005-62251 A | 3/2005 |
| JP | 2005-62312 A | 3/2005 |
| JP | 2005-172622 A | 6/2005 |
| JP | 2006-53495 A | 2/2006 |
| JP | 2006-333493 A | 12/2006 |
| JP | 2007-41504 A | 2/2007 |
| JP | 2008-256824 A | 10/2008 |
| JP | 2008/262029 A | 10/2008 |
| JP | 2009-42372 A | 2/2009 |
| JP | 2009-163901 A | 7/2009 |
| JP | 2009-169012 A | 7/2009 |
| JP | 2009-186647 A | 8/2009 |
| JP | 2009-294249 A | 12/2009 |
| JP | 2011-43603 A | 3/2011 |
| JP | 2011-508911 A | 3/2011 |
| JP | 4816819 B1 | 11/2011 |
| JP | 4894966 B1 | 3/2012 |
| WO | 2006/137326 A1 | 12/2006 |
| WO | 2008/114502 A1 | 9/2008 |
| WO | 2010/048960 A1 | 5/2010 |
| WO | 2012/032670 A1 | 3/2012 |

OTHER PUBLICATIONS

Japanese Office Action (Reasons of Rejection) dated Aug. 5, 2014 in connection with counterpart Japanese Patent Application No. 2011-029426 with English translation.
Supplementary European Search Report dated Sep. 12, 2014 in connection with counterpart European Application No. 10857013.
Espacenet English abstract of JP 2009-169012 A.
Espacenet English abstract of JP 7-77924 A.
Espacenet English abstract of JP 2002-165231 A.
Espacenet English abstract of JP 2004-38012 A.
Espacenet English abstract of JP 2005-62012 A.
Espacenet English abstract of JP 2006-53495 A.
Espacenet English abstract of JP 2012058718 A.
Espacenet English abstract of JP 2012058712 A.
Patent Abstract and Machine English Translation of JP 2008/262029 A.
Patent Abstract and Machine English Translation of JP 2004-264512 A.
Patent Abstract and Machine English Translation of JP 6-208089 A.
Patent Abstract and Machine English Translation of JP 2004-144936 A.
Speckle Phenomena in Optics; Joseph W. Goodman; Includes bibliographical references and index; ISBN 0-9747077-9-1; 2006.
International Preliminary Report on Patentability dated Apr. 9, 2013 for Application No. PCT/JP2010/065692.
International Search Report dated Nov. 2, 2010 for Application No. PCT/JP2010/065691.
International Preliminary Report on Patentability dated Apr. 9, 2013 for Application No. PCT/JP2010/065691.
International Search Report dated Dec. 7, 2010 for Application No. PCT/JP2010/065690.
International Preliminary Report on Patentability dated Apr. 9, 2013 for Application No. PCT/JP2010/065690.
Espacenet English abstract of WO 2006/137326 A1 dated Dec. 2006.
Espacenet English abstract of CN 101203802 A dated Jun. 2008.
Patent Abstracts of Japan English abstract of JP 2000-19641 A dated Jan. 2000.
Espacenet English abstract of JP 2009-42372 A dated Feb. 2009.
Espacenet English abstract of CN 101363967 A dated Feb. 2009.
Espacenet English abstract of JP 2005-62312 A dated Mar. 2005.
Espacenet English abstract of JP 2006-333493A dated Dec. 2006.
Espacenet English abstract of JP 2004-233177 A dated Aug. 2004.

(56) References Cited

OTHER PUBLICATIONS

Patent Abstracts of Japan English abstract of JP 61-260108 A dated Nov. 1986.
Patent Abstracts of Japan English abstract of JP 61-50003 A dated Mar. 1986.
Patent Abstracts of Japan English abstract of JP 2005-172622 A dated Jun. 2005.
Chinese Office Action (Notification of Filing Divisional Application) dated Dec. 23, 2013 for Chinese Patent Application No. 201080069008.3 with English translation.
Chinese Office Action (Notification of First Office Action) dated Jan. 14, 2014 for Chinese Patent Application No. 201080069001.1 with English translation.
Supplementary European Search Report dated Feb. 5, 2014 for EP Application No. 10857011.-1904.
Supplementary European Search Report dated Feb. 28, 2014 for EP Application No. 10857012.8-1560.
Office Action dated Apr. 3, 2014 for U.S. Appl. No. 13/702,027.
Japanese Office Action (Reasons of Rejection) dated May 27, 2014 in connection with counterpart Japanese Patent Application No. 2011-025648 with English translation.
Japanese Office Action (Reasons of Rejection) dated Jul. 8, 2014 in connection with counterpart Japanese Application No. 2011-502184 with English translation.
Espacenet English abstract of JP 2009-186647 A.
Japanese Office Action (Reasons of Rejection) dated Mar. 24, 2015 in connection with related Japanese Patent Application No. 2011-029426 with English translation.
Chinese Office Action dated Jan. 23, 2015 in connection Chinese Application No. 201080069008.3 with English translation.
European Office Action dated Feb. 24, 2015 for EP Application No. 10 857 012.8-1560.
European Office Action dated Mar. 23, 2015 for EP Application No. 10 857 011.0-1904.
Japanese Office Action dated Jan. 27, 2015 for Japanese Application No. 2011-084314 with English translation.
Espacenet English abstract of JP 11-174377 A.
Espacenet English abstract of JP 2003-15079 A.
Espacenet English abstract of JP 2005-62251 A.
Espacenet English abstract of JP 2007-41504 A.
Espacenet English abstract of JP 2011-43603 A.
English translation of Japanese Office Action (Reasons of Rejection) dated Nov. 11, 2014 in connection with counterpart Japanese Application No. 2011-502184.
Office Action dated Dec. 4, 2014 for related U.S. Appl. No. 14/190,671.
Office Action dated Jan. 2, 2015 for U.S. Appl. No. 14/455,434.
Chinese Office Action dated Apr. 21, 2015 for Chinese Application No. 201080069008.3 with English translation.
Chinese Office Action dated Apr. 28, 2015 for Chinese Application No. 201410573547.0 with English translation.
Espacenet English abstract of CN 101276062 A.
Espacenet English abstract of CN 101233443 A.
Chinese Office Action dated Dec. 3, 2015 for Chinese Application No. 201410573547.0 with English translation.
Japanese Office Action dated Mar. 8, 2016 for Japanese Application No. 2015-086762 with English translation.
J-PlatPat English abstract of JP 2008-256824 A.
J-PlatPat English translation of JP 2008-256824 A.
J-PlatPat English abstract of JP 2009-294249 A.
J-PlatPat English translation of JP 2009-294249 A.

* cited by examiner

| MEASUREMENT EXAMPLES | MEASURING SYSTEMS | SPECKLE CONTRASTS |
|---|---|---|
| 1 | LASER PARALLEL LIGHT | 20.1 |
| 2 | THE PRESENT INVENTION (VOLUME HOLOGRAM) | 3.0 |
| 3 | THE PRESENT INVENTION (SURFACE RELIEF CGH) | 3.7 |
| 4 | MONOCHROMATIC LED | 4.0 |

ILLUMINATING METHOD USING COHERENT LIGHT SOURCE

RELATED APPLICATION

This application is a divisional of application Ser No. 13/704,405 filed on Dec. 14, 2012, which is an application under 35 U.S.C. 371 of International Application No. PCT/JP2010/065692 filed on Sep. 7, 2010, which was published on 15 Mar. 2012, with International Publication Number WO 2012/032670, the entire contents of which are incorporated herein by reference.

TECHNICAL FIELD

The present invention relates to an illumination apparatus using a coherent light source. In particular, the present invention relates to a technology for reducing speckle noise in an illumination apparatus utilizing coherent light produced by a laser light source as illumination light.

BACKGROUND ART

As light sources for illumination apparatuses, incandescent bulbs and fluorescent lamps have been conventionally used. For illumination apparatuses that are required to output illumination light with high brightness, mercury lamps, halogen lamps, and xenon lamps, etc., are utilized as light sources. For example, Japanese Unexamined Patent Publication No. 2004-264512A discloses an illumination apparatus using an ultrahigh pressure mercury lamp and a projection type image display apparatus using the illumination apparatus. Further, recently, illumination apparatuses using LEDs as light sources have become popular. The service life of LEDs is generally ten thousand hours or more, and LEDs have gained attention as new general-purpose light sources that are replacing incandescent bulbs and fluorescent lamps.

On the other hand, laser light sources are widely utilized as light sources that generate coherent light in various industrial fields. In detail, laser light has been widely utilized in the optical communications field, the semiconductor device manufacturing field, and the optical field of holograms, etc., by taking advantage of its unique features such as monochromaticity, directionality, and coherency. In particular, semiconductor lasers have sufficiently long service lives as practical light sources, and also have extremely high energy use efficiency. The reason why illumination apparatuses using laser light sources have not generally become popular so far although they have the above-described advantages is that laser light sources have a unique problem of occurrence of speckle noise.

Speckles form a spot-like pattern that appears when coherent light such as laser light is irradiated onto a diffusing surface, and is observed as spot-like unevenness in brightness on an irradiated surface when laser light is irradiated onto an illuminating object. For example, when one point on a screen is indicated with a laser pointer, the spot of the laser light appears as a bright glare on the screen. This is caused by the occurrence of speckle noise on the screen, and the speckle noise becomes a factor that physiologically causes harmful effects to an observer. It is considered that the reason why speckles are caused when coherent light is used is that coherent lights reflected by portions of the diffusing and reflecting surface of a screen, etc., interfere with each other due to extremely high coherency. For example, detailed theoretical consideration on occurrence of speckles is described in "Speckle Phenomena in Optics, Joseph W. Goodman, Roberts & Co., 2006."

In use as a laser pointer or the like, a small spot is only seen by an observer, so that a severe problem does not occur. However, when a laser light source is used as a light source of an illumination apparatus and a comparatively wide region is illuminated by coherent light, speckle noise occurring in the illuminated region physiologically harmfully effects an observer and causes symptoms such as feeling sick. Because of this problem, illumination apparatuses using laser light sources are conventionally recognized as unsuitable for general use.

Of course, several detailed methods for reducing the above-described speckle noise have been proposed. For example, Japanese Unexamined Patent Publication No. H06-208089A discloses a technology by which laser light is irradiated onto a scatter plate, scattered light obtained from the scatter plate is utilized as illumination light, and the scatter plate is driven to rotate by a motor, whereby reducing speckles. Japanese Unexamined Patent Publication No. 2004-144936A discloses a technology for reducing speckles by oscillating an optical diffusing element disposed between a laser light source and an illuminating object. However, to rotate a scatter plate or oscillate an optical diffusing element, a large-scale mechanical drive mechanism is necessary, so that the apparatus is entirely increased in size, and power consumption is also increased. Speckles are not necessarily effectively removed by these methods.

Therefore, an object of the present invention is to provide a technology for efficiently and sufficiently reducing occurrence of speckles in an illumination apparatus using a coherent light source.

DISCLOSURE OF INVENTION (1) The first feature of the present invention resides in an illumination apparatus using a coherent light source, comprising:

a coherent light source that generates a coherent light beam;

a hologram recording medium on which an image of a scatter plate is recorded; and a light beam scanning device that irradiates the light beam onto the hologram recording medium, and scans the light beam so that an irradiation position of the light beam on the hologram recording medium changes with time, wherein the image of the scatter plate is recorded as a hologram on the hologram recording medium by using reference light irradiated along an optical path, the coherent light source generates a light beam with a wavelength capable of reproducing the image of the scatter plate, the light beam scanning device scans the light beam so that an irradiation direction of the light beam with respect to the hologram recording medium is along the optical path of the reference light, and reproduction light of the image of the scatter plate obtained from the hologram recording medium is used as illumination light.

(2) The second feature of the present invention resides in the illumination apparatus using a coherent light source having the first feature, wherein the light beam scanning device bends the light beam at a scanning origin, irradiates the bent light beam onto the hologram recording medium, and changes an irradiation position of the bent light beam on the hologram recording medium with time by changing a bending mode of the light beam with time, the image of the scatter plate is recorded as a hologram on the hologram recording medium by using reference light that converges on a specific convergence point or reference light that diverges from a specific convergence point, and the light beam scanning device scans the light beam by setting the convergence point as the scanning origin.

(3) The third feature of the present invention resides in the illumination apparatus using a coherent light source having the second feature, wherein the image of the scatter plate is recorded on the hologram recording medium by using reference light that three-dimensionally converges or diverges along a side surface of a cone whose tip is on the convergence point.

(4) The fourth feature of the present invention resides in the illumination apparatus using a coherent light source having the third feature, wherein the light beam scanning device has a function of bending the light beam so that the light beam swings on a plane including the scanning origin, and scans the light beam in a one-dimensional direction on the hologram recording medium.

(5) The fifth feature of the present invention resides in the illumination apparatus using a coherent light source having the third feature, wherein the light beam scanning device has a function of bending the light beam so that the light beam swings on a first plane including the scanning origin and a function of bending the light beam so that the light beam swings on a second plane including the scanning origin and orthogonal to the first plane, and scans the light beam in two-dimensional directions on the hologram recording medium.

(6) The sixth feature of the present invention resides in the illumination apparatus using a coherent light source having the second feature, wherein the image of the scatter plate is recorded on the hologram recording medium by using reference light that two-dimensionally converges or diverges along a plane including the convergence point.

(7) The seventh feature of the present invention resides in the illumination apparatus using a coherent light source having the sixth feature, wherein the light beam scanning device has a function of bending the light beam so that the light beam swings on a plane including the scanning origin, and scans the light beam in a one-dimensional direction on the hologram recording medium.

(8) The eighth feature of the present invention resides in the illumination apparatus using a coherent light source having the first feature, wherein the light beam scanning device changes the irradiation position of the light beam on the hologram recording medium with time by irradiating the light beam onto the hologram recording medium while moving the light beam parallel, the image of the scatter plate is recorded as a hologram on the hologram recording medium by using reference light composed of a parallel light flux, and the light beam scanning device scans the light beam by irradiating the light beam onto the hologram recording medium in a direction parallel to the reference light.

(9) The ninth feature of the present invention resides in the illumination apparatus using a coherent light source having any one of the first to eighth features, wherein the coherent light source is a laser light source that generates a laser beam.

(10) The tenth feature of the present invention resides in the illumination apparatus using a coherent light source having any one of the first to ninth features, wherein the hologram recording medium records the image of the scatter plate as a volume hologram.

(11) The eleventh feature of the present invention resides in the illumination apparatus using a coherent light source having any one of the first to ninth features, wherein the hologram recording medium records the image of the scatter plate as a surface relief hologram.

(12) The twelfth feature of the present invention resides in the illumination apparatus using a coherent light source having any one of the first to ninth features, wherein the hologram recorded on the hologram recording medium is a computer generated hologram.

(13) The thirteenth feature of the present invention resides in the illumination apparatus using a coherent light source having any one of the first to ninth features, wherein the hologram recorded on the hologram recording medium is a Fourier transform hologram.

(14) The fourteenth feature of the present invention resides in the illumination apparatus using a coherent light source having any one of the first to ninth features, wherein the hologram recorded on the hologram recording medium is a reflection type hologram, and reflected diffracted light of the light beam is used as illumination light.

(15) The fifteenth feature of the present invention resides in the illumination apparatus using a coherent light source having any one of the first to ninth features, wherein the hologram recorded on the hologram recording medium is a transmission type hologram, and transmitted diffracted light of the light beam is used as illumination light.

(16) The sixteenth feature of the present invention resides in the illumination apparatus using a coherent light source having any one of the first to fifteenth features, wherein the light beam scanning device is a scanning mirror device, a total reflection prism, a refracting prism, or an electro-optic crystal.

(17) The seventeenth feature of the present invention resides in the illumination apparatus using a coherent light source having any one of the first to sixteenth features, wherein the coherent light source includes n laser light sources that generate monochromatic laser beams with different wavelengths, and a light synthesizer that produces a synthesized light beam by synthesizing laser beams generated by the n laser light sources, the light beam scanning device scans the synthesized light beam produced by the light synthesizer on the hologram recording medium, and the image of the scatter plate is recorded as n holograms on the hologram recording medium so that reproduction images are obtained by each laser beam generated by the n laser light sources.

(18) The eighteenth feature of the present invention resides in an image display apparatus comprising: the illumination apparatus according to any one of the first to seventeenth features, and a display medium having a light receiving surface to be illuminated by the illumination apparatus, wherein the image of the scatter plate covered by a transmissive film on which an image is drawn is recorded on the hologram recording medium, and the light receiving surface is disposed at a position at which a reproduction image of the scatter plate is formed.

(19) The nineteenth feature of the present invention resides in an illumination method using a coherent light source, comprising:

a preparation step of creating a hologram recording medium by recording an image of a scatter plate as a hologram on a recording medium; and an illumination step of irradiating a coherent light beam onto the hologram recording medium, and scanning the light beam on the hologram recording medium so as to change an irradiation position with time, wherein in the preparation step, coherent illumination light is irradiated onto the scatter plate, scattered light obtained from the scatter plate is used as object light, and irradiated onto the recording medium along an optical path, coherent light with a same wavelength as a wavelength of the illumination light is used as reference light, and interference fringes formed by the object light and the reference light are recorded on the recording medium to create the hologram recording medium, in the illumination step, a light beam with a wavelength capable of reproducing the image of the scatter plate scans toward an irradiation position on the hologram recording medium by passing through an optical path along the optical path of the reference light, and reproduction light of the image of the scatter plate obtained from the hologram recording medium is used as illumination light.

(20) The twentieth feature of the present invention resides in the illumination method using a coherent light source having the nineteenth feature, wherein in the preparation step, by condensing a light flux of substantially parallel coherent light by using a convex lens having a focal point on a position of convergence point, reference light that three-dimensionally converges on the convergence point or reference light that three-dimensionally diverges from the convergence point is produced, and by using the produced reference light, interference fringes are recorded.

(21) The twenty-first feature of the present invention resides in the illumination method using a coherent light source having the nineteenth feature, wherein in the preparation step, by condensing a light flux of substantially parallel coherent light on a condensing axis by using a cylindrical lens having a central axis parallel to the condensing axis, reference light that two-dimensionally converges on a point on the condensing axis or reference light that two-dimensionally diverges from a point on the condensing axis is produced, and by using the produced reference light, interference fringes are recorded.

(22) The twenty-second feature of the present invention resides in the illumination method using a coherent light source having the nineteenth feature, wherein in the preparation step, interference fringes are recorded by using reference light composed of a parallel light flux.

(23) The twenty-third feature of the present invention resides in the illumination method using a coherent light source having any one of the nineteenth to twenty-second features, wherein a computer generated hologram is recorded on the hologram recording medium by carrying out the process of the preparation step by a simulation operation using a virtual scatter plate.

(24) The twenty-fourth feature of the present invention resides in the illumination method using a coherent light source having the twenty-third feature, wherein a model including a large number of point light sources aligned in a grid pattern on a plane is used as the virtual scatter plate.

(25) The twenty-fifth feature of the present invention resides in an illumination apparatus using a coherent light source, comprising:

a coherent light source that generates a coherent light beam;

a microlens array including a collection of a large number of independent lenses; and a light beam scanning device that irradiates the light beam onto the microlens array and carries out scanning so that an irradiation position of the light beam on the microlens array changes with time, wherein each of the independent lenses included in the microlens array has a function of refracting light irradiated from the light beam scanning device and forming an irradiation region on a light receiving surface, and is configured so that irradiation regions formed by the independent lenses become substantially a same common region on the light receiving surface.

(26) The twenty-sixth feature of the present invention resides in the illumination apparatus using a coherent light source having the twenty-fifth feature, wherein the light beam scanning device bends the light beam at a scanning origin and irradiates the light beam onto the microlens array, and changes a bending mode of the light beam with time so that an irradiation position of the bent light beam on the microlens array changes with time, and each of the independent lenses included in the microlens array refracts light incident from the scanning origin to form a common irradiation region on the light receiving surface.

(27) The twenty-seventh feature of the present invention resides in an illumination apparatus using a coherent light source, comprising:

a coherent light source that generates a coherent light beam;

a light beam scanning device that carries out beam scanning by controlling either or both of a direction and a position of the light beam; and an optical diffusing element that diffuses an incident light beam and emits a light beam, wherein the light beam scanning device guides a light beam generated by the coherent light source toward the optical diffusing element, and carries out scanning so that an incidence position of the guided light beam on the optical diffusing element changes with time, and the optical diffusing element has a function of forming irradiation regions on a light receiving surface by diffusing an incident light beam, and is configured so that the formed irradiation regions become substantially a same common region on the light receiving surface regardless of an incidence position of the incident light beam.

BEST MODE FOR CARRYING OUT THE INVENTION

<<<Section 1. Hologram Recording Medium Used in the Present Invention>>>

Figure 1:
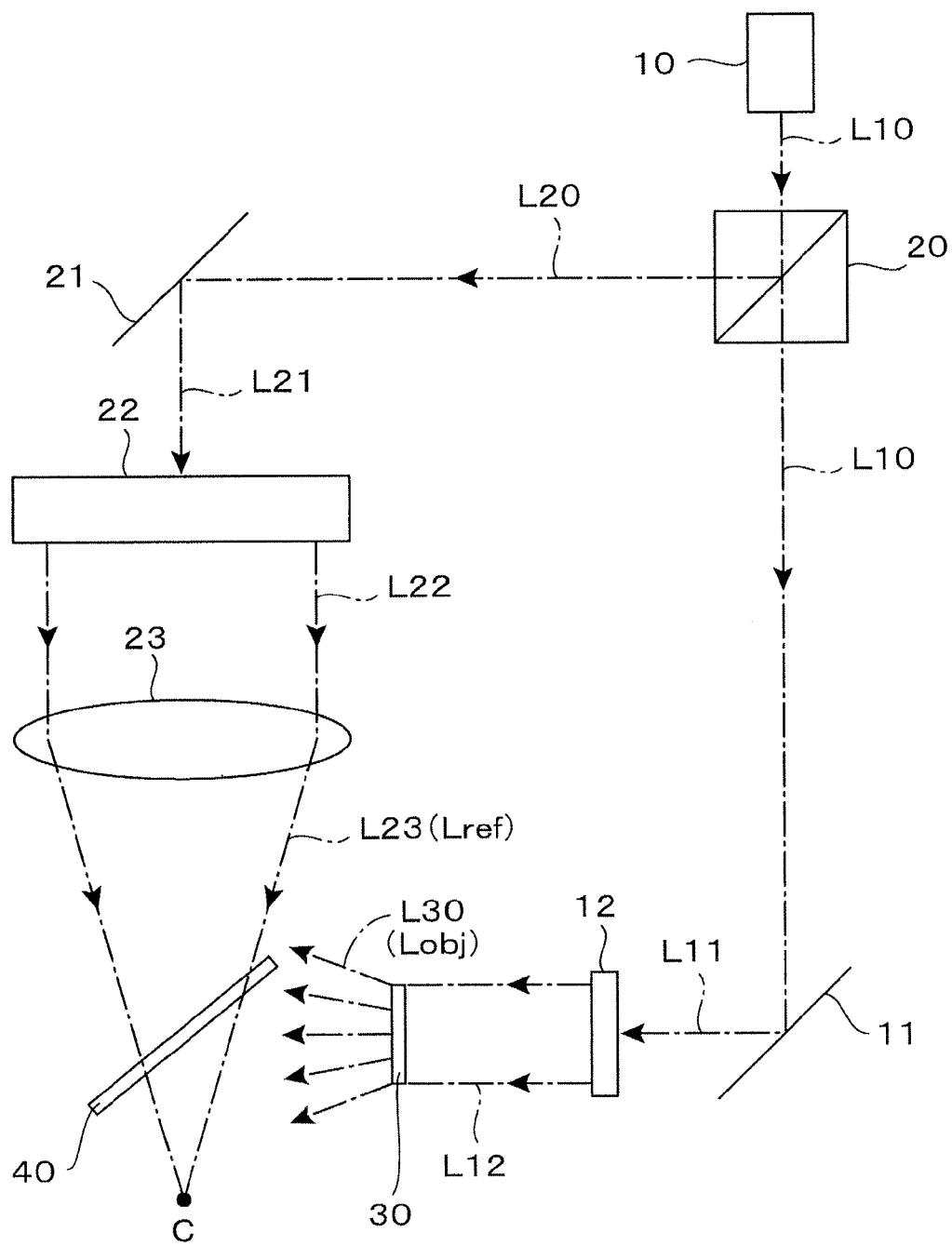
FIG. 1 is an optical system arrangement drawing showing a process of creating a hologram recording medium as a component of an illumination apparatus according to the present invention.

First, a description is given of features of a hologram recording medium to be used as a component of an illumination apparatus according to an embodiment of the present invention. FIG. 1 is an optical system arrangement drawing showing a process of creating this hologram recording medium. With this optical system, a hologram recording medium on which an image of a scatter plate is recorded is created.

A coherent light source 10 shown at the upper right of the drawing produces a coherent light beam L10, and in actuality, a laser light source that generates a monochromatic laser light having a circular section is used. The coherent light beam L10 produced by this laser light source is split into two beams by a beam splitter 20. Specifically, a part of the light beam L10 is directly transmitted through the beam splitter 20 and guided to the lower side of the drawing, and the other part of the light beam is reflected by the beam splitter 20 and guided as a light beam L20 to the left side of the drawing.

The light beam L10 transmitted through the beam splitter 20 performs the role of generating object light Lobj of the scatter plate. Specifically, the light beam L10 that advanced to the lower side of the drawing is reflected by a reflecting mirror 11 to become a light beam L11, and further, expanded in diameter by a beam expander 12 to compose a parallel light flux L12, and irradiated onto the entire region of the right side surface of the scatter plate 30. The scatter plate 30 is a plate having a property of scattering irradiated light, and is also generally called an optical diffuser plate. In the embodiment shown herein, a transmission type scatter plate (for example, opal glass plate) into which microparticles (light scatterers) for scattering light inside are kneaded is used. Therefore, as illustrated, the parallel light flux L12 irradiated onto the right side surface of the scatter plate 30 is transmitted through the scatter plate 30 and emits as scattered light L30 from the left side surface. This scattered light L30 composes object light Lobj of the scatter plate 30.

On the other hand, the light beam L20 reflected by the beam splitter 20 performs the role of generating reference light Lref. Specifically, the light beam L20 that advanced to the left side of the drawing from the beam splitter 20 is reflected by the reflecting mirror 21 to become a light beam L21, and further, expanded in diameter by the beam expander 22 to compose a parallel light flux L22, refracted by a convex lens 23 having a focal point on the point C, and then irradiated onto a hologram photosensitive medium 40. Even when the parallel light flux L22 is composed of a collection of parallel light beams not necessarily strictly parallel to each other, there is no problem in practical use, as far as the parallel light flux L22 is composed of a collection of light beams substantially parallel to each other. The hologram photosensitive medium 40 is a photosensitive medium to be used for recording a hologram image. Irradiation light L23 to be irradiated onto the hologram photosensitive medium 40 composes reference light Lref.

Finally, onto the hologram photosensitive medium 40, the object light Lobj of the scatter plate 30 and the reference light Lref are irradiated. Here, the object light Lobj and the reference light Lref are coherent lights both having the same wavelength λ produced by the coherent light source 10 (laser light source), so that interference fringes of these lights are recorded on the hologram photosensitive medium 40. In other words, on the hologram photosensitive medium 40, an image of the scatter plate 30 is recorded as a hologram.

Figure 2:
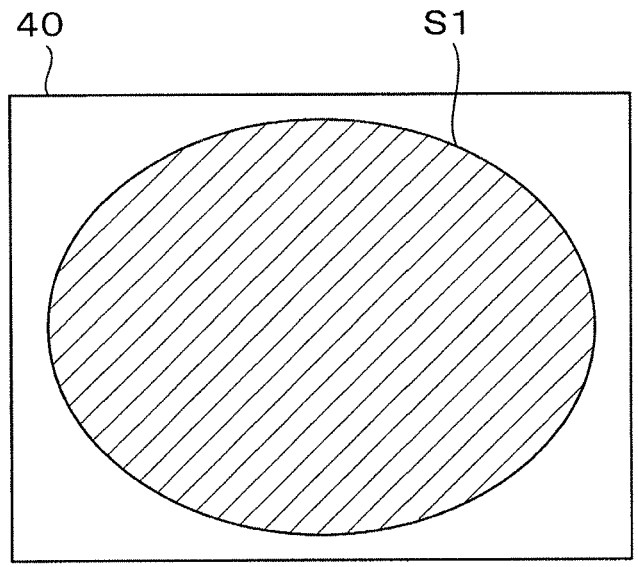
FIG. 2 is a plan view showing a position relationship between a section S1 of reference light L23 and a hologram photosensitive medium 40 in the process shown in FIG. 1.

FIG. 2 is a plan view showing the position relationship between the section S1 of the reference light L23 (Lref) and the hologram photosensitive medium 40 shown in FIG. 1. The parallel light flux L22 expanded in diameter by the beam expander 22 has a circular section, so that the reference light Lref condensed by the convex lens 23 converges in a conical shape whose tip is on the focal point C of the lens. However, in the example shown in FIG. 1, the hologram photosensitive medium 40 is disposed obliquely to the central axis of this cone, so that the section S1 cutting the reference light L23 (Lref) by the surface of the hologram photosensitive medium 40 becomes oval as shown in FIG. 2.

Figure 3:
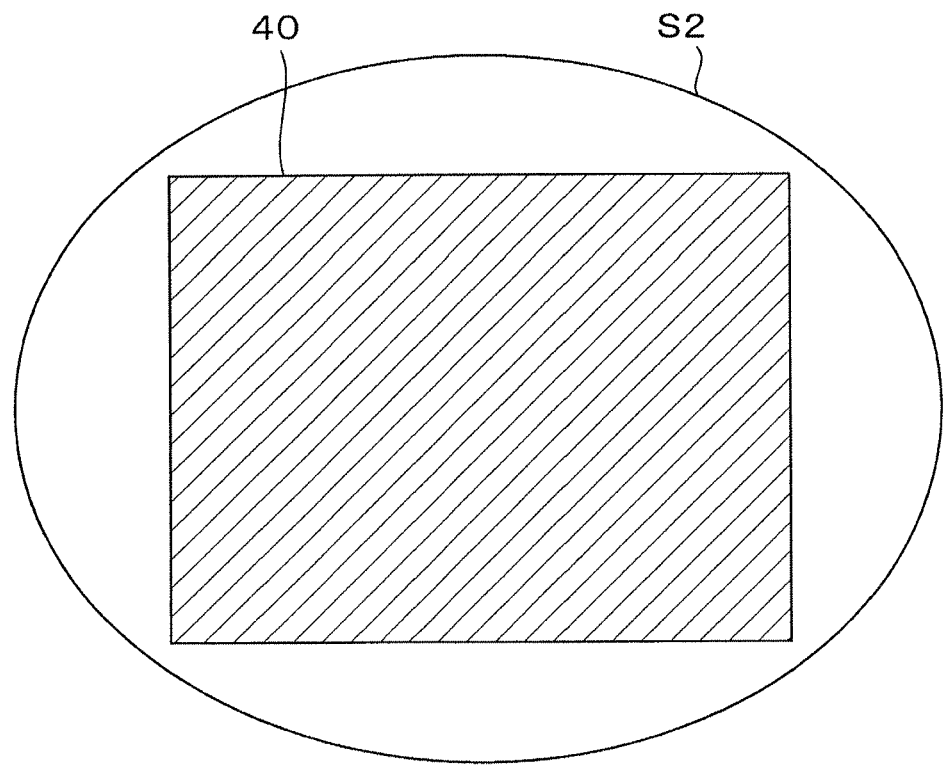
FIG. 3 is a plan view showing a position relationship between another section S2 of the reference light L23 and the hologram photosensitive medium 40 in the process shown in FIG. 1.

Thus, in the example shown in FIG. 2, the reference light Lref is irradiated into only the region hatched in the drawing of the entire region of the hologram photosensitive medium 40, so that the hologram of the scatter plate 30 is recorded in only this hatched region. Of course, it is also possible that the whole hologram photosensitive medium 40 is included in the section S2 of the reference light Lref as shown in the example shown in FIG. 3 by producing a parallel light flux L22 with a larger diameter by the beam expander 22 and using a convex lens 23 with a larger diameter. In this case, as shown with hatching in the drawing, the hologram of the scatter plate 30 is recorded on the entire surface of the hologram photosensitive medium 40. When creating a hologram recording medium to be used in the present invention, recording can be carried out in either of the modes shown in FIG. 2 and FIG. 3.

Figure 4:
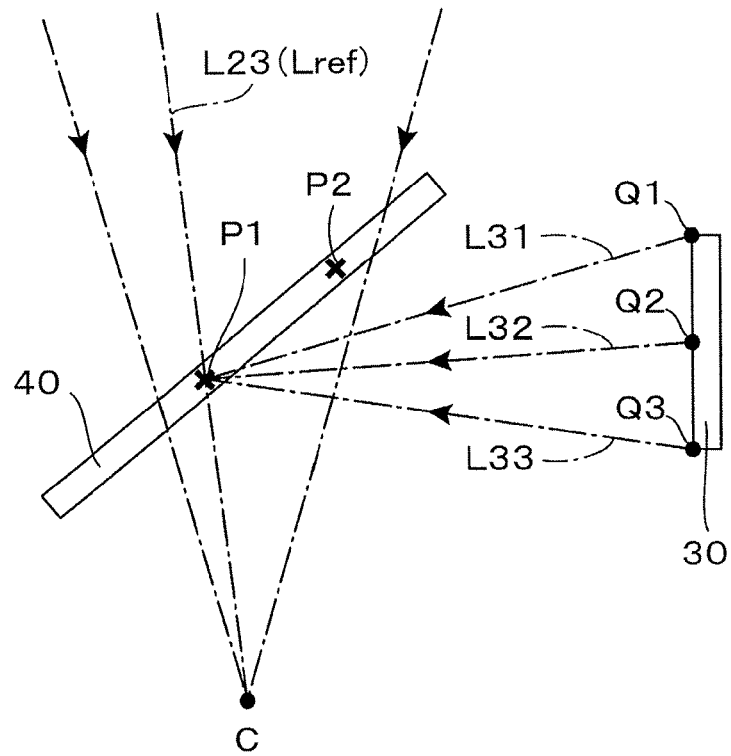
FIG. 4 is a partial enlargement view around a scatter plate 30 and the hologram photosensitive medium 40 in the optical system shown in FIG. 1.

Next, a detailed description is given of the optical process of recording the image of the scatter plate 30 on the hologram photosensitive medium 40. FIG. 4 is a partial enlargement view around the scatter plate 30 and the hologram photosensitive medium 40 in the optical system shown in FIG. 1. As described above, the reference light Lref is obtained by condensing the parallel light flux L22 having a circular section by the convex lens 23 having the focal point C, and the reference light Lref converges in a conical shape whose tip is on the focal point C. Hereinafter, this focal point C is referred to as a convergence point. As illustrated, the reference light L23 (Lref) irradiated onto the hologram photosensitive medium 40 converges on this convergence point C.

On the other hand, light (object light Lobj) emitted from the scatter plate 30 is scattered light, and advances in various directions. For example, as illustrated, assuming an object point Q1 on the upper end of the left side surface of the scatter plate 30, scattered light is emitted in all directions from this object point Q1. Similarly, scattered light is also emitted in all directions from arbitrary object points Q2 and Q3. Therefore, focusing attention on an arbitrary point P1 within the hologram photosensitive medium 40, information on interference fringes formed by object lights L31, L32, and L33 from the object points Q1, Q2, and Q3 and the reference light Lref advancing toward the convergence point C is recorded. Of course, in actuality, object points on the scatter plate 30 are not only Q1, Q2, and Q3, so that similarly, information from all object points on the scatter plate 30 is recorded as information on interference fringes formed by interference with the reference light Lref. In other words, on the illustrated point P1, all information of the scatter plate 30 is recorded. In exactly the same manner, all information of the scatter plate 30 is also recorded on the illustrated point P2. Thus, all information of the scatter plate 30 is recorded on each portion of the hologram photosensitive medium 40. This is the essence of a hologram.

Hereinafter, the hologram photosensitive medium 40 on which information of the scatter plate 30 is recorded by the above-described method is referred to as a hologram recording medium 45. To obtain a hologram reproduction image of the scatter plate 30 by reproducing the hologram recording medium 45, coherent light with the same wavelength as that of the light used for recording is irradiated as illumination light for reproduction from a direction corresponding to the reference light Lref used for recording.

Figure 5:
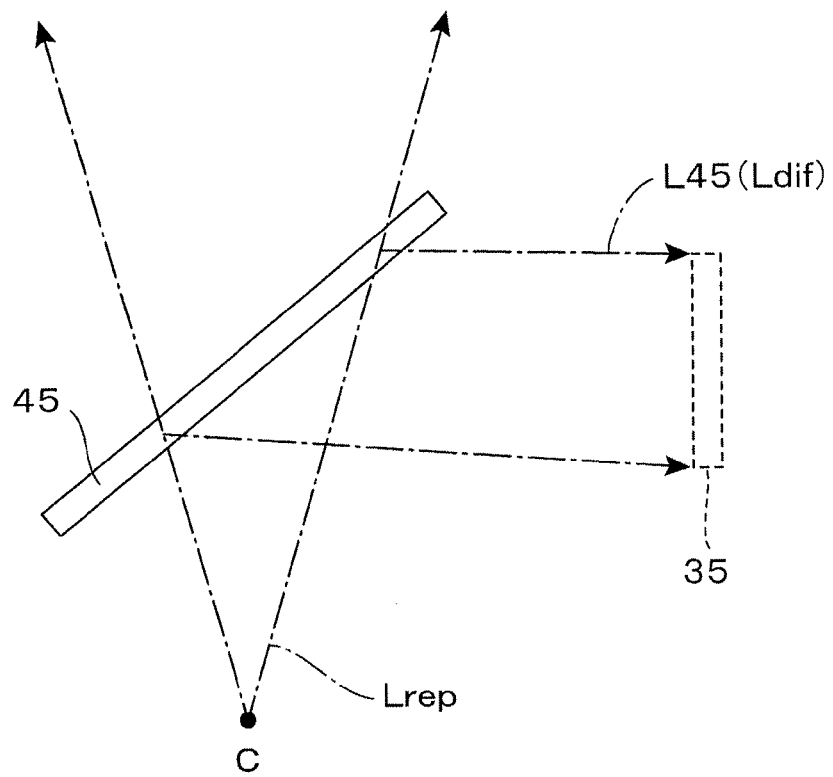
FIG. 5 is a view showing a process of reproducing an image 35 of the scatter plate by using the hologram recording medium 45 created by the process shown in FIG. 1.

FIG. 5 is a view showing a process of reproducing an image 35 of the scatter plate by using the hologram recording medium 45 created by the process shown in FIG. 4. As illustrated, illumination light for reproduction Lrep is irradiated onto the hologram recording medium 45 from the lower side. This illumination light for reproduction Lrep is coherent light that diverges as a spherical wave from a point light source positioned at the convergence point C, and a part of the illumination light for reproduction becomes light to irradiate the hologram recording medium 45 while diffusing in a conical shape as illustrated. The wavelength of this illumination light for reproduction Lrep is equal to the wavelength used for recording on the hologram recording medium 45 (that is, the wavelength of coherent light generated by the coherent light source 10 shown in FIG. 1).

Here, the position relationship between the hologram recording medium 45 and the convergence point C shown in FIG. 5 is exactly the same as the position relationship between the hologram photosensitive medium 40 and the convergence point C shown in FIG. 4. Therefore, the illumination light for reproduction Lrep shown in FIG. 5 corresponds to light that reverses on the optical path of the reference light Lref shown in FIG. 4. When the illumination light for reproduction Lrep meeting these conditions is irradiated onto the hologram recording medium 45, by diffracted light L45 (Ldif) thereof, the hologram reproduction image 35 (shown by the dashed line in the drawing) of the scatter plate 30 is obtained. The position relationship between the hologram recording medium 45 and the reproduction image 35 shown in FIG. 5 is exactly the same as the position relationship between the hologram photosensitive medium 40 and the scatter plate 30 shown in FIG. 4.

Thus, the technology for recording an image of an arbitrary object as a hologram and reproducing it is a known technology put into practical use from a long time ago. However, when creating a hologram recording medium to be utilized for general use, a parallel light flux is used as reference light Lref. To reproduce the hologram recorded by using reference light Lref consisting of a parallel light flux, illumination light for reproduction Lrep consisting of a parallel light flux is also utilized, and this is convenient.

On the other hand, when light that converges on the convergence point C is utilized as reference light Lref as shown in FIG. 4, when carrying out reproduction, as shown in FIG. 5, light that diverges from the convergence light C must be used as illumination light for reproduction Lrep. In actuality, to obtain the illumination light for reproduction Lrep shown in FIG. 5, an optical system such as a lens must be disposed at a specific position. If the position relationship between the hologram recording medium 45 and the convergence point C when carrying out reproduction does not match the position relationship between the hologram photosensitive medium 40 and the convergence point C when carrying out recording, an accurate reproduction image 35 cannot be obtained, so that the illumination conditions when carrying out reproduction are limited (when reproduction is carried out by using a parallel light flux, only the irradiation angle must be satisfied among the illumination conditions).

For this reason, a hologram recording medium created by using reference light Lref that converges on the convergence point C is not suitable for general use. Even so, the reason why light that converges on the convergence point C is used as reference light Lref in the embodiment described herein is for making light beam scanning easy when carrying out reproduction. Specifically, in FIG. 5, for convenience of description, a method for producing the reproduction image 35 of the scatter plate 30 by using illumination light for reproduction Lrep diverging from the convergence point C is shown, however, in the present invention, in actuality, reproduction using the illumination light for reproduction Lrep diffusing in a conical shape as illustrated is not carried out. Instead of this, a method in which a light beam is scanned is adopted. Hereinafter, a detailed description is given of this method.

Figure 6:
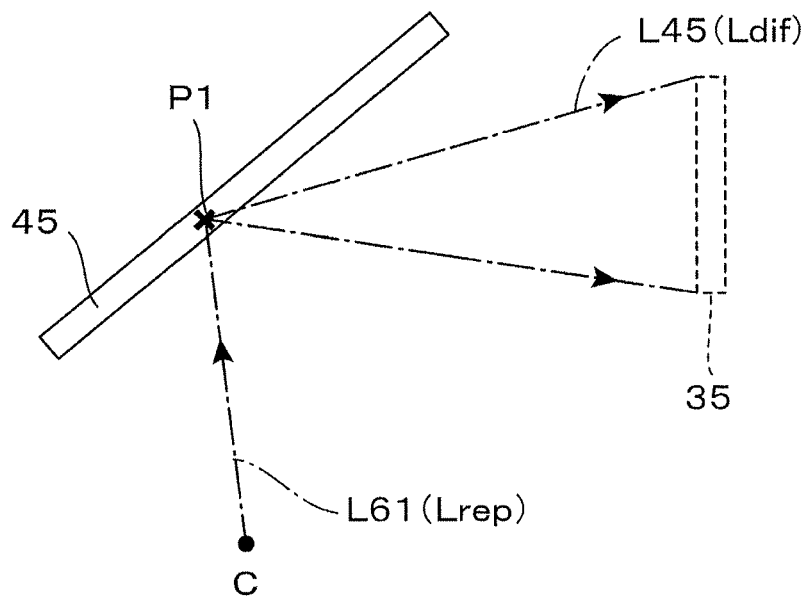
FIG. 6 is a view showing a process of reproducing an image 35 of the scatter plate by irradiating only one light beam onto the hologram recording medium 45 created by the process shown in FIG. 1.

FIG. 6 is a drawing showing a process of reproducing the image 35 of the scatter plate 30 by irradiating only one light beam onto the hologram recording medium 45 created by the process shown in FIG. 4. Specifically, in this example, only one light beam L61 advancing toward one point P1 within the medium from the convergence point C is given as illumination light for reproduction Lrep. Of course, the light beam L61 is coherent light with the same wavelength as that of light for recording. As described above with reference to FIG. 4, on the arbitrary point P1 within the hologram recording medium 45, all information of the scatter plate 30 is recorded. Therefore, by irradiating illumination light for reproduction Lrep onto the position of the point P1 shown in FIG. 6 under conditions corresponding to the reference light Lref used for recording, the reproduction image 35 of the scatter plate 30 can be produced by using only interference fringes recorded near this point P1. FIG. 6 shows a state where the reproduction image 35 is reproduced by the diffracted light L45 (Ldif) from the point P1.

Figure 7:
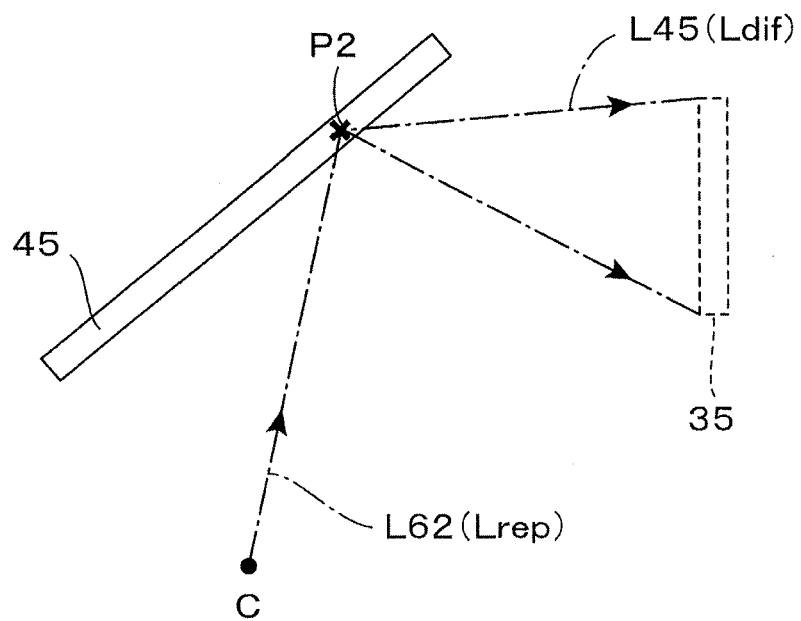
FIG. 7 is another view showing the process of reproducing the image 35 of the scatter plate by irradiating only one light beam onto the hologram recording medium 45 created by the process shown in FIG. 1.

On the other hand, FIG. 7 shows an example in which only one light beam L62 advancing toward another point P2 within the medium from the convergence point C is given as illumination light for reproduction Lrep. In this case, all information of the scatter plate 30 is also recorded on the point P2, so that by irradiating the illumination light for reproduction Lrep onto the position of the point P2 under conditions corresponding to the reference light Lref used for recording, the reproduction image 35 of the scatter plate 30 can be produced by using only interference fringes recorded near the point P2. FIG. 7 shows a state where the reproduction image 35 is reproduced by the diffracted light L45 (Ldif) from the point P2. The reproduction image 35 shown in FIG. 6 and the reproduction image 35 shown in FIG. 7 are of the same scatter plate 30 as the original image, so that the reproduction images are theoretically identical to each other and produced at the same position.

Figure 8:
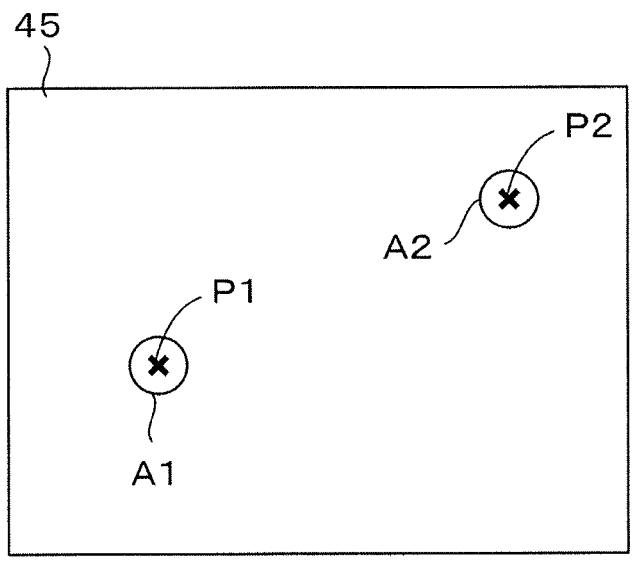
FIG. 8 is a plan view showing irradiation positions of light beams in the reproduction process shown in FIG. 6 and FIG. 7.

FIG. 8 is a plan view showing an irradiation position of a light beam in the reproduction process shown in FIG. 6 and FIG. 7. The point P1 shown in FIG. 8 corresponds to the point P1 shown in FIG. 6, and the point P2 shown in FIG. 8 corresponds to the point P2 shown in FIG. 7. The reference symbols A1 and A2 each denote sections of the illumination light for reproduction Lrep. The shapes and sizes of the sections A1 and A2 depend on the shapes and sizes of the sections of the light beams L61 and L62. They also depend on the irradiation positions on the hologram recording medium 45. Here, for convenience, circular sections A1 and A2 are shown, however, in actuality, when light beams L61 and L62 having circular sections are used, the sectional shapes become oval shapes flattened according to the irradiation positions.

Thus, the contents of the interference fringes recorded near the point P1 and near the point P2 shown in FIG. 8 are completely different from each other, however, whichever point a light beam that becomes illumination light for reproduction Lrep is irradiated onto, the same reproduction image 35 is obtained at the same position. This is because the illumination light for reproduction Lrep is a light beam advancing toward each point P1 and P2 from the convergence point C, so that the illumination light for reproduction Lrep in the direction corresponding to the direction of the reference light Lref when carrying out recording shown in FIG. 4 is given to each point.

The same applies, of course, to an arbitrary point on the hologram recording medium 45 although FIG. 8 illustrates only two points P1 and P2. Therefore, when a light beam is irradiated onto an arbitrary point on the hologram recording medium 45, as long as the light beam is light from the convergence point C, the same reproduction image 35 is obtained at the same position. In fact, as shown in FIG. 2, when a hologram is recorded on only a region (hatched region in the drawing) that is a part of the hologram photosensitive medium 40, the reproduction image 35 is obtained only when a light beam is irradiated onto a point within the region.

Finally, the hologram recording medium 45 described herein has features that it is a medium on which an image of the scatter plate 30 is recorded as a hologram by using the reference light Lref that converges on the specific convergence point C, and when a light beam passing through this convergence point C is irradiated as illumination light for reproduction Lrep onto an arbitrary position, a reproduction image 35 of the scatter plate 30 is produced. Therefore, when a light beam passing through the convergence point C is scanned as illumination light for reproduction Lrep on the hologram recording medium 45, by diffracted lights Ldif obtained from respective irradiation points, the same reproduction image 35 is reproduced at the same position.

<<<Section 2. Illumination Apparatus According to Basic Embodiment of the Present Invention>>>

Subsequently, a description is given of a configuration of an illumination apparatus 100 according to a basic embodiment of the present invention with reference to the side view of FIG. 9. As illustrated, this illumination apparatus 100 includes a hologram recording medium 45, a coherent light source 50, and a light beam scanning device 60.

Here, the hologram recording medium 45 is a medium having the features described in Section 1, on which the image 35 of the scatter plate 30 is recorded. The coherent light source 50 generates a coherent light beam L50 with the same wavelength as the wavelength of light (object light Lobj and reference light Lref) used when creating the hologram recording medium 45.

On the other hand, the light beam scanning device 60 bends the light beam L50 generated by the coherent light source 50 at the scanning origin B and irradiates the light beam onto the hologram recording medium 45, and scans the light beam by changing the bending mode of the light beam L50 with time so that the irradiation position of the bent light beam L60 on the hologram recording medium 45 changes with time. This device is generally known as a scanning mirror device. In the drawing, for convenience of description, the bending mode at the timing t1 is illustrated by an alternate long and short dashed line, and the bending mode at the timing t2 is illustrated by an alternate long and two short dashed line. Specifically, at the timing t1, the light beam L50 is bent at the scanning origin B and irradiated as a light beam L60(t1) onto the point P(t1) of the hologram recording medium 45, however, at the timing t2, the light beam L50 is bent at the scanning origin B and irradiated as a light beam L60(t2) onto the point P(t2) of the hologram recording medium 45.

In the drawing, for convenience of description, only the bending modes at the two timings t1 and t2 are shown, however, in actuality, in a period from the timing t1 to the timing t2, the bending direction of the light beam smoothly changes and the irradiation position of the light beam L60 on the hologram recording medium 45 gradually moves from the point P(t1) to the point P(t2) in the drawing. Specifically, in the period from the timing t1 to the timing t2, the irradiation position of the light beam L60 is scanned from the point P(t1) to the point P(t2) on the hologram recording medium 45.

Figure 9:
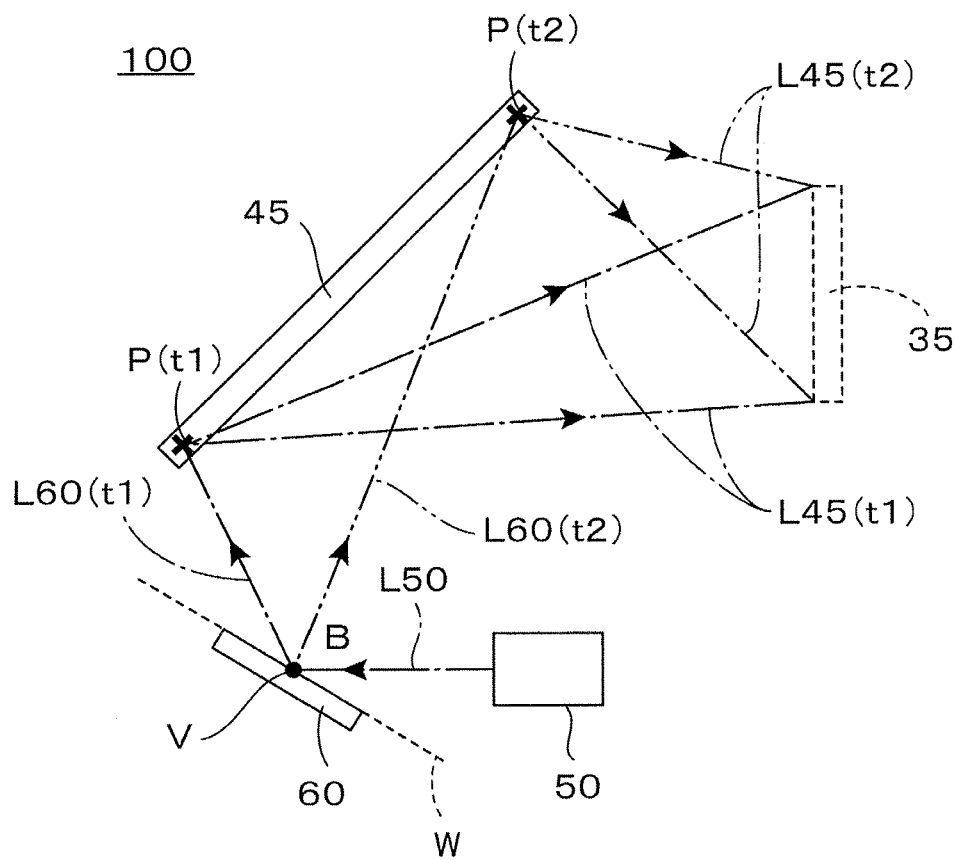
FIG. 9 is a side view showing a configuration of an illumination apparatus 100 according to a basic embodiment of the present invention.

Here, by matching the position of the scanning origin B with the position of the convergence point C shown in FIG. 4 (in other words, by making the position relationship between the hologram recording medium 45 and the scanning origin B in FIG. 9 equal to the position relationship between the hologram photosensitive medium 40 and the convergence point C in FIG. 4), on each irradiation position of the hologram recording medium 45, the light beam L60 is irradiated in a direction corresponding to the reference light Lref shown in FIG. 4 (direction reversing the optical path of the reference light Lref shown in FIG. 4). Therefore, at each irradiation position of the hologram recording medium 45, the light beam L60 functions as correct illumination light for reproduction Lrep for reproducing a hologram recorded there.

For example, at the timing t1, the reproduction image 35 of the scatter plate 30 is produced by the diffracted light L45(t1) from the point P(t1), and at the timing t2, the reproduction image 35 of the scatter plate 30 is produced by the diffracted light L45(t2) from the point P(t2). Of course, in the period from the timing t1 to t2, the reproduction image 35 of the scatter plate 30 is also produced similarly by diffracted lights from respective positions onto which the light beam L60 is irradiated. Specifically, as long as the light beam L60 advances from the scanning origin B toward the hologram recording medium 45, whichever position on the hologram recording medium 45 the light beam L60 is irradiated onto, the same reproduction image 35 is produced at the same position by diffracted light from the irradiation position.

This phenomenon occurs because, as shown in FIG. 4, the image of the scatter plate 30 is recorded as a hologram on the hologram recording medium 45 by using the reference light L23 that converges on the specific convergence point C, and the light beam scanning device 60 scans the light beam L60 by using this convergence point C as a scanning origin B. Of course, even when scanning by the light beam scanning device 60 is stopped and the irradiation position of the light beam L60 is fixed to a point on the hologram recording medium 45, the same reproduction image 35 is continuously produced at the same position. The reason why the light beam L60 is scanned in spite of this is for reducing speckle noise.

Figure 10:
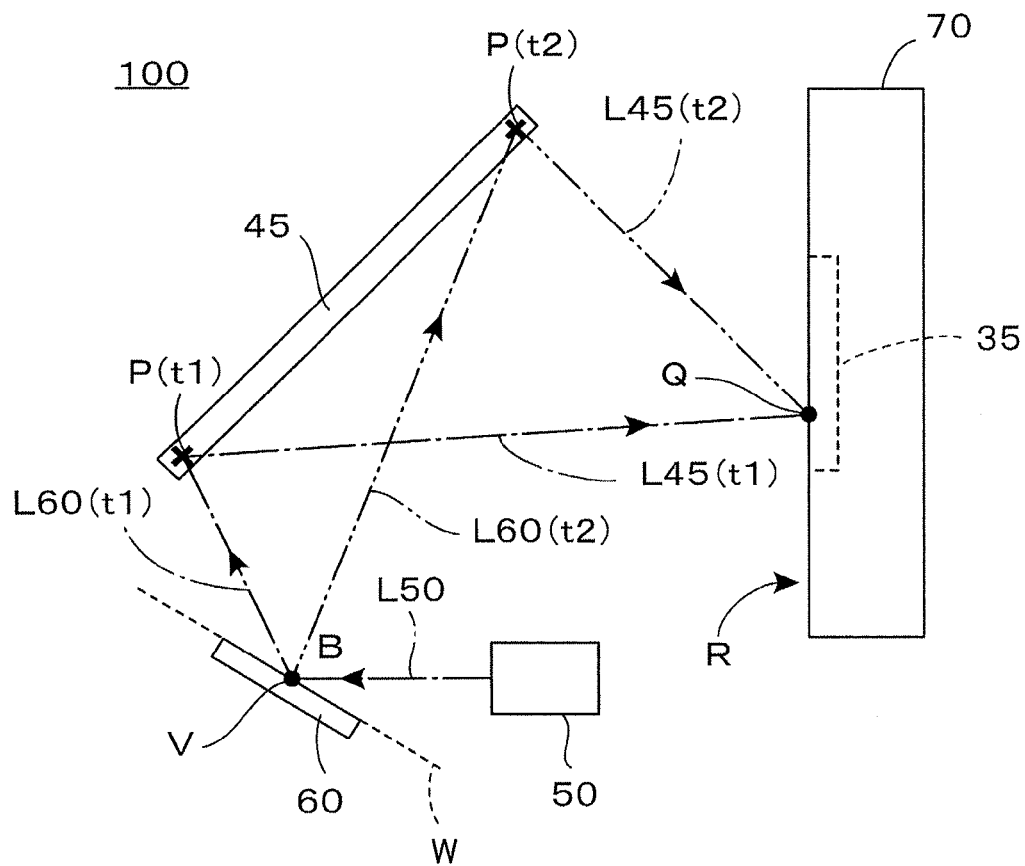
FIG. 10 is a side view showing a state where an illuminating object 70 is illuminated by using the illumination apparatus 100 shown in FIG. 9.

FIG. 10 is a side view showing a state where an illuminating object 70 is illuminated by using the illumination apparatus 100 shown in FIG. 9. The illumination apparatus 100 uses reproduction light of the image 35 of the scatter plate obtained from the hologram recording medium 45 as illumination light. Here, a case where the illuminating object 70 is disposed at a position at which the left side surface of the illuminating object 70 matches the left side surface of the reproduction image 35 of the scatter plate as illustrated for illuminating the left side surface of the illuminating object 70 by the illumination apparatus 100, is considered. In this case, the left side surface of the illuminating object 70 becomes a light receiving surface R, and diffracted light from the hologram recording medium 45 is irradiated onto this light receiving surface R.

Therefore, an arbitrary attention point Q is set on the light receiving surface R, and diffracted light reaching this attention point Q is considered. First, at the timing t1, the light beam L50 output from the coherent light source 50 is bent at the scanning origin B as illustrated by an alternate long and short dashed line in the drawing, and irradiated as a light beam L60(t1) onto the point P(t1). Then, diffracted light L45(t1) from the point P(t1) reaches the attention point Q. On the other hand, at the timing t2, the light beam L50 output from the coherent light source 50 is bent at the scanning origin B as illustrated by the alternate long and two short dashed line in the drawing, and irradiated as a light beam L60(t2) onto the point P(t2). Then, diffracted light L45(t2) from the point P(t2) reaches the attention point Q.

Finally, by this diffracted light, at the position of the attention point Q, the reproduction image corresponding to the position of the attention point Q on the scatter plate 30 is always produced, however, the incidence angle of the diffracted light with respect to the attention point Q differs between the timing t1 and the timing t2. In other words, when the light beam L60 is scanned, although the reproduction image 35 formed on the light receiving surface R does not change, the incidence angle of diffracted light that reaches the respective points on the light receiving surface R changes with time. This change in incidence angle with time greatly contributes to speckle reduction.

As described above, the reason why speckles occur when using coherent light is because coherent lights reflected by the respective portions of the light receiving surface R have extremely high coherence and interfere with each other. However, in the present invention, by scanning the light beam L60, the incidence angle of the diffracted light onto each portion of the light receiving surface R changes with time, so that the interference mode also changes with time and has multiplicity. Therefore, the factor that causes speckles is dispersed temporally, so that the situation where a spot-like pattern having a physiological harmful effect is constantly observed can be eased. This is the basic principle of the present invention.

Figure 11:
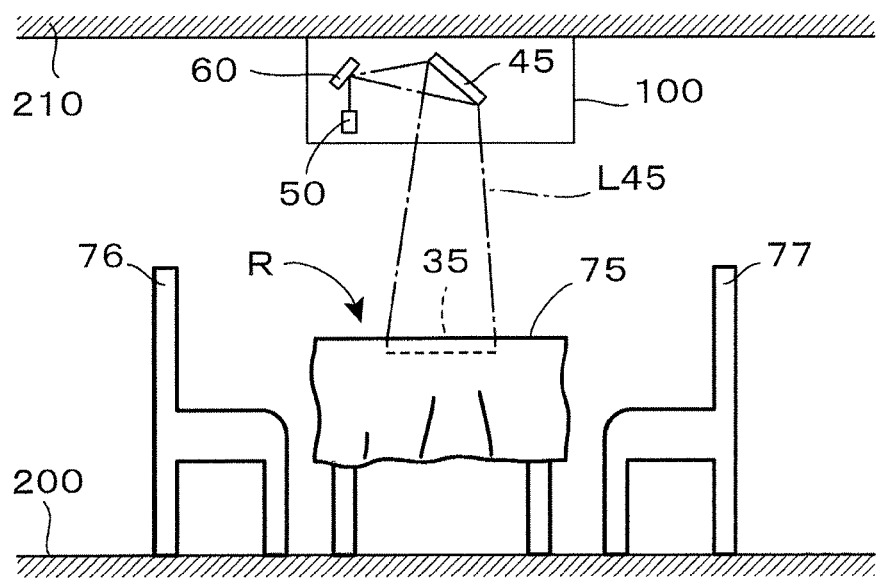
FIG. 11 is a side view showing a state where the illumination apparatus 100 shown in FIG. 9 is attached to a ceiling and illuminates an upper surface of a table.

FIG. 11 is a side view showing an example in which the illumination apparatus 100 shown in FIG. 9 is utilized for room illumination. As illustrated, on the floor surface 200 in a room, a table 75 and chairs 76 and 77 are disposed, and the upper surface of the table 75 (in this example, the surface of the table cloth) is an illuminating object and forms a light receiving surface R. The illumination apparatus 100 is attached to the ceiling 210 as illustrated. In the drawing, for convenience, the illumination apparatus 100 is drawn to have substantially the same size as that of the table 75, however, in actuality, by using a semiconductor laser as the coherent light source 50 and using a scanning mirror device as the light beam scanning device 60, the illumination apparatus can be reduced in size as small as a general illumination apparatus for room illumination.

As the coherent light source 50, for example, by using a green laser light source, the upper surface (light receiving surface R) of the table 75 is illuminated by a green illumination spot. Such illumination using coherent light is distinctively different from conventional general room illumination, and exerts a novel illuminating effect on an observer. Specifically, due to the monochromaticity of laser light, the light receiving surface R is illuminated by an extremely bright green. In addition, due to the directionality of laser light, an illumination spot having a clear contour can be formed. In actuality, the contour of the illumination spot formed on the light receiving surface R becomes the contour of the reproduction image 35, so that as long as the light receiving surface R is disposed at the reproduction position of the reproduction image 35, a clear reproduction image of the scatter plate 30 is formed on the light receiving surface R. Further, the laser light source generally has high light conversion efficiency, so that illumination with high brightness can be carried out with low power consumption.

Thus, monochromic surface illumination with extremely high chromatic purity is realized by the present invention. In addition, in the illumination apparatus according to the present invention, as described above, the incidence angle of light to be irradiated onto the respective portions of the light receiving surface R is multiplexed by time, so that occurrence of speckles is reduced. Therefore, glaring spot-like noise that is observed in illumination with a laser pointer is reduced, and does not give a physiological feeling of discomfort to humans. Therefore, an illumination apparatus that can be sufficiently utilized for room illumination is realized.

FIG. 11 shows an example in which the illuminating object (the upper surface of the table 75) is disposed at a position at which the reproduction image 35 of the scatter plate 30 is produced, however, the position of the illuminating object is not particularly limited in use as an illumination apparatus. Specifically, in the example shown in FIG. 11, on the upper surface (light receiving surface R) of the table 75, the reproduction image 35 of the scatter plate 30 is produced, so that the light receiving surface R performs a function as a screen for displaying the reproduction image 35, and as described above, an illumination spot with a clear contour is formed on the light receiving surface R. However, as in use for an illumination apparatus, the illumination spot with a clear contour does not necessarily have to be formed.

For example, in the arrangement shown in FIG. 11, if the table 75 is removed, diffracted light from the hologram recording medium 45 is irradiated onto the floor surface 200. Even in this case, the production position of the reproduction image 35 does not change, so that the reproduction image 35 cannot be seen by the human eye (at the position of the reproduction image 35, no object that scatters light is present, so that the reproduction image 35 is not formed on the human eye). Nevertheless, the diffracted light reaching the floor surface 200 is scattered by the floor surface 200 and reaches the human eye, so that the illumination apparatus 100 can perform the illumination function for the floor surface 200.

Of course, an illumination method in which the position of the light receiving surface R is intentionally set outside from the production position of the reproduction image 35 can also be adopted. For example, by disposing a table slightly lower than the table 75 shown in FIG. 11, a slightly defocused reproduction image 35 is formed on the upper surface of the table. However, for the purpose of illuminating the upper surface of the table, formation of the defocused reproduction image 35 is more preferable in some cases because it brings about a soft illuminating effect. Thus, when the illumination apparatus according to the present invention is utilized, the position of the illuminating object should be properly determined according to preference, and is not particularly limited.

<<<Section 3. Detailed Description of Components of Illumination Apparatus>>>

The illumination apparatus 100 shown in FIG. 9 includes, as described in Section 2, the hologram recording medium 45, the coherent light source 50, and the light beam scanning device 60. Here, a further detailed description is given of these components.

<3-1> Coherent Light Source

First, as the coherent light source 50, a light source that generates a coherent light beam L50 with the same wavelength as the wavelength of light (object light Lobj and reference light Lref) used for creating the hologram recording medium 45 is used. In fact, the wavelength of the light beam L50 to be generated by the coherent light source 50 does not necessarily have to be completely equal to the wavelength of the light used for creating the hologram recording medium 45, and as long as the light beam has an approximate wavelength, a reproduction image of a hologram can be obtained. In conclusion, the coherent light source 50 to be used in the present invention is a light source that generates a coherent light beam L50 with a wavelength capable of reproducing the image 35 of the scatter body.

In actuality, the same light source as the coherent light source 10 shown in FIG. 5 can be utilized as it is as the coherent light source 50. In the case of the embodiment described herein, a DPSS (Diode Pumped Solid State) laser device capable of emitting laser light with a wavelength $\lambda=532$ nm (green) was used as the coherent light source 50. The DPSS laser can obtain comparatively high-output laser light with a desired wavelength although the DPSS laser is small in size, so that it is a coherent light source to be suitably utilized for the illumination apparatus according to the present invention.

This DPSS laser device has a coherent length longer than that of a general semiconductor laser, so that speckles easily occur, and therefore, the DPSS laser device is conventionally recognized as unsuitable for the illumination purpose. Conventionally, in order to reduce speckles, an effort was made to broaden a range of emission wavelength of laser and reduce the coherent length as small as possible. On the other hand, in the present invention, even when a light source with a long coherent length is used, due to the above-described principle, occurrence of speckles can be effectively reduced, so that even when a DPSS laser device is used as a light source, occurrence of speckles does not pose a problem in practical use. In this regard, by utilizing the present invention, an effect of widening the selection of the light source is obtained.

<3-2> Light Beam Scanning Device

Figure 12:
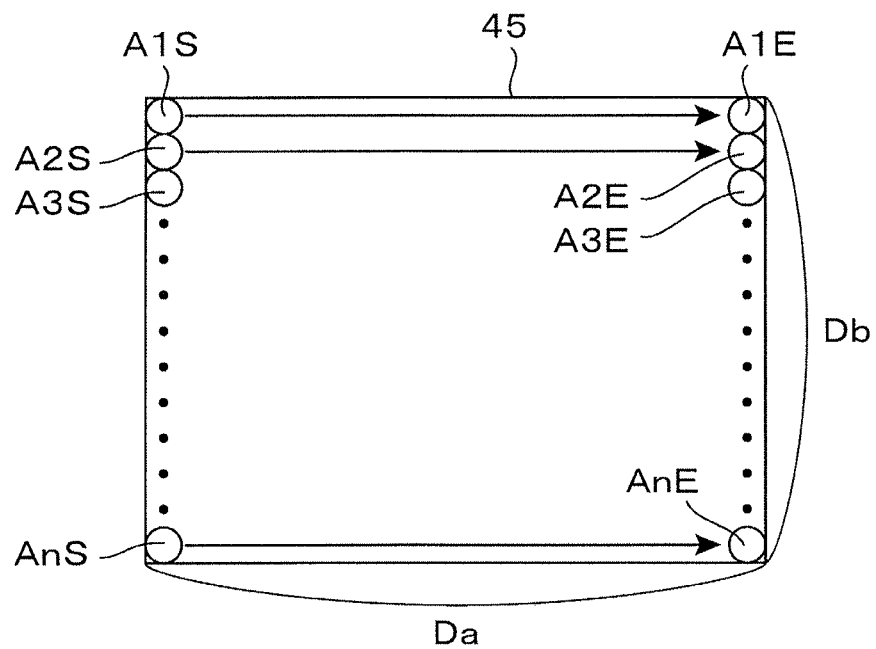
FIG. 12 is a plan view showing a first example of a scanning mode of a light beam on the hologram recording medium 45 in the illumination apparatus 100 shown in FIG. 9.

The light beam scanning device 60 is a device having a function of scanning a light beam on the hologram recording medium 45. Here, a description is given of a detailed method of beam scanning by this light beam scanning device 60. FIG. 12 is a plan view showing a first example of a scanning mode of a light beam on the hologram recording medium 45 in the illumination apparatus 100 shown in FIG. 9. In this example, as the hologram recording medium 45, a medium with a lateral width Da=12 mm and a longitudinal width Db=10 mm is used, and as a light beam L60 to scan on the medium, a laser beam having a circular section with a diameter of 1 mm is used. As illustrated, a method is adopted in which, in the same manner as scanning of an electronic beam in a CRT, the irradiation position of the light beam L60 is scanned in the horizontal direction from the start region A1S to the end region A1E of the first line, and then, scanned in the horizontal direction from the start region A2S to the end region A2E of the second line . . . , and last, scanned in the horizontal direction from the start region AnS to the end region AnE of the n-th line, and returned to the start region A1S of the first line again and repeats the same operation.

Figure 13:
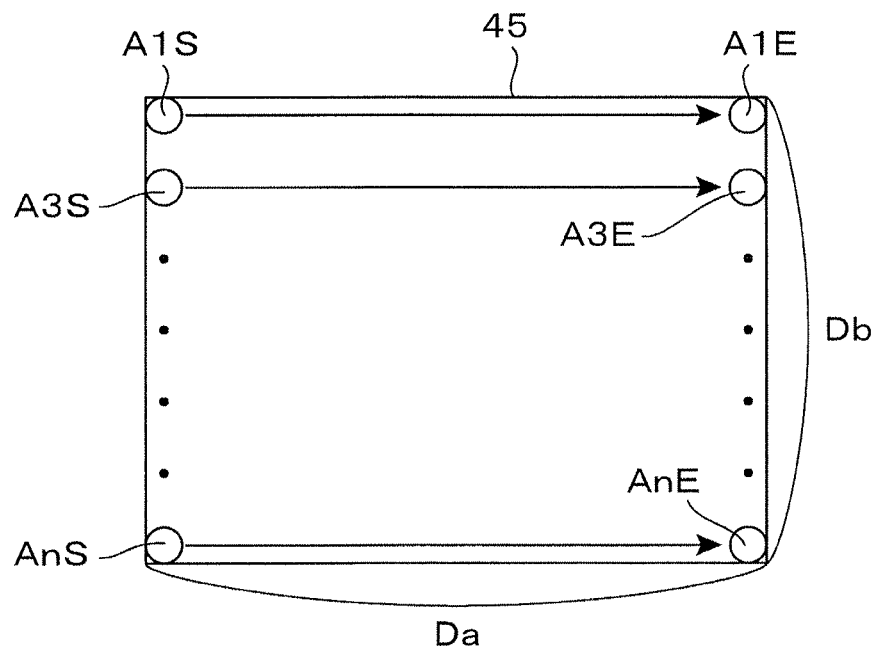
FIG. 13 is a plan view showing a second example of a scanning mode of a light beam on the hologram recording medium 45 in the illumination apparatus 100 shown in FIG. 9.
Figure 14:
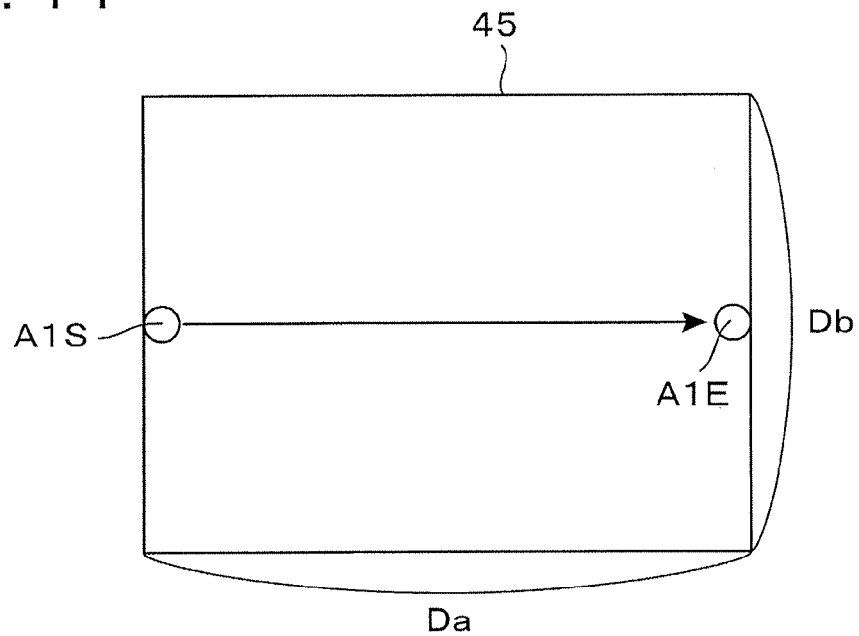
FIG. 14 is a plan view showing a third example of a scanning mode of a light beam on the hologram recording medium 45 in the illumination apparatus 100 shown in FIG. 9.

With the scanning method shown in FIG. 12, the entire surface of the hologram recording medium 45 is scanned by a light beam, however, in the present invention, the entire surface of the hologram recording medium 45 does not necessarily have to be completely scanned. For example, FIG. 13 shows an example in which only odd-numbered lines are scanned by the scanning method shown in FIG. 12, and scanning of even-numbered lines is omitted. Thus, in the case of scanning on every other line, hologram information recorded in a region that is a part of the hologram recording medium 45 does not contribute to image reproduction at all, however, this does not pose any particular problem. FIG. 14 shows an example of a more extreme scanning method in which scanning on only one line in the horizontal direction from the start region A1S to the end region A1E is repeated at the center position of the longitudinal width Db.

Of course, the scanning direction can be freely set, and after the first line is scanned from the left to the right, the second line may be scanned from the right to the left. The scanning direction is not necessarily limited to being straight, and scanning that draws a circle on the hologram recording medium 45 is also possible.

As in the example shown in FIG. 2, when the reference light Lref is irradiated onto and recorded on only the region (hatched region) that is a part of the hologram photosensitive medium 40, no hologram is recorded on the other region (white region on the outer side). In this case, if the white region on the outer side is also scanned, the reproduction image 35 cannot be obtained, so that the illumination becomes temporarily dark. Therefore, in practical use, only the region on which a hologram is recorded is preferably scanned.

As described above, scanning of a light beam on the hologram recording medium 45 is carried out by the light beam scanning device 60. This light beam scanning device 60 has a function of bending the light beam L50 from the coherent light source 50 at the scanning origin B (convergence point C when recording a hologram) and irradiating the light beam onto the hologram recording medium 45. Further, by changing the bending mode (the bending direction and the amount of the bending angle) with time, scanning is carried out so that the irradiation position of the bent light beam L60 onto the hologram recording medium 45 changes with time. A device having this function is utilized as a scanning mirror device in various optical systems.

For example, in the example shown in FIG. 9, as the light beam scanning device 60, for convenience, a simple reflecting mirror is illustrated, however, in actuality, drive mechanisms that turn this reflecting mirror in biaxial directions are provided. Specifically, when a scanning origin B is set at the center position of the reflecting surface of the illustrated reflecting mirror, and a V axis and a W axis passing through this scanning origin B and orthogonal to each other on the reflecting surface are defined, a mechanism that turns the reflecting mirror around the V axis (axis perpendicular to the paper surface of the drawing) and a mechanism that turns the reflecting mirror around the W axis (axis illustrated by the dashed line in the drawing) are provided.

Thus, by using a reflecting mirror capable of turning around the V axis and the W axis independently, the reflected light beam L60 can be scanned in the horizontal direction and the vertical direction on the hologram recording medium 45. For example, in the above-described mechanism, by turning the reflected light around the V axis, the irradiation position of the light beam L60 can be scanned in the horizontal direction on the hologram recording medium 45 shown in FIG. 12, and by turning the reflected light around the W axis, the irradiation position can be scanned in the vertical direction.

In conclusion, as long as the light beam scanning device 60 has a function of bending the light beam L60 so that the light beam swings on a plane including the scanning origin B, the irradiation position of the light beam L60 can be scanned in a one-dimensional direction on the hologram recording medium 45. As in the example shown in FIG. 14, to operate the scanning device to scan the light beam only in the horizontal direction, the light beam scanning device 60 needs to have just the function of scanning the irradiation position of the light beam in a one-dimensional direction on the hologram recording medium 45.

On the other hand, to operate the scanning device so as to scan the irradiation position of the light beam L60 in two-dimensional directions on the hologram recording medium 45, the light beam scanning device 60 is provided with a function of bending the light beam L60 so that the light beam swings on a first plane including the scanning origin B (in FIG. 9, by turning the reflecting mirror around the V axis, the light beam L60 swings on a plane included in the paper surface), and a function of bending the light beam L60 so that the light beam swings on a second plane that includes the scanning origin B and is orthogonal to the first plane (in FIG. 9, by turning the reflecting mirror around the W axis, the light beam L60 swings on a plane perpendicular to the paper surface).

As a scanning mirror device for scanning the irradiation position of a light beam in a one-dimensional direction, a polygon mirror is widely utilized. As a scanning mirror device for scanning the irradiation position in two-dimensional directions, a pair of polygon mirrors may be combined and used, or devices such as a gimbal mirror, a galvano mirror, and a MEMS mirror are known. Further, other than normal mirror devices, a total reflection prism, a refracting prism, and an electro-optic crystal (KTN crystal, etc.) or the like can also be utilized as the light beam scanning device 60.

If the diameter of the light beam L60 becomes close to the size of the hologram recording medium 45, the effect of reducing speckles may be lost, so that care must be taken for this. In the example shown in FIG. 12 to FIG. 14, as described above, the hologram recording medium 45 has a lateral width Da=12 mm and a longitudinal width Db=10 mm, and the light beam L60 is a laser beam having a circular section with a diameter of 1 mm. Under these dimensional conditions, the effect of reducing speckles is sufficiently obtained. This is because any region on the hologram recording medium 45 is just temporarily irradiated with the light beam L60, and diffracted light is not continuously output from the same region.

Figure 15:
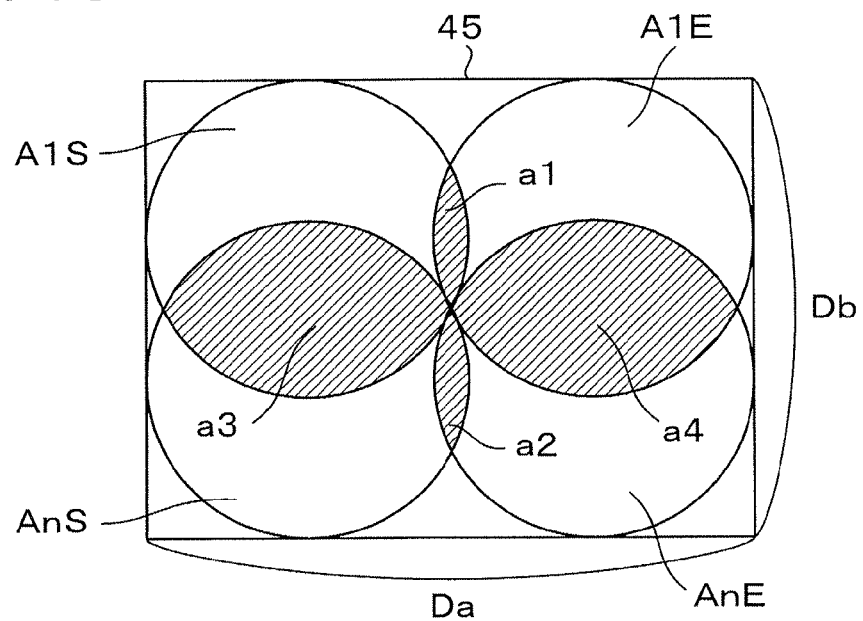
FIG. 15 is a plan view showing a fourth example of a scanning mode of a light beam on the hologram recording medium 45 in the illumination apparatus 100 shown in FIG. 9.

However, for example, as in the example shown in FIG. 15, when a light beam with a diameter close to the size of the hologram recording medium 45 is irradiated, a region (hatched region in the drawing) from which diffracted light is continuously output is formed. Specifically, even when the irradiation position of the light beam L60 is scanned in the horizontal direction from the start region A1S to the end region A1E of the first line, the hatched regional in the drawing is always irradiated with the light beam. Similarly, even when the irradiation position is scanned in the horizontal direction from the start region AnS to the end region AnE of the n-th line, the region a2 is always irradiated with the light beam. In the case of scanning in the vertical direction, the start regions of the respective lines overlap in the region a3, and the end regions of the respective lines overlap in the region a4, so that these regions are always irradiated with the light beam even after the line to be scanned is changed.

Eventually, these hatched regions cannot benefit from light beam scanning, and diffracted light is continuously output therefrom. As a result, diffracted light emitted from such a region is continuously incident on the light receiving surface R of the illuminating object at the same angle, and becomes a factor that causes speckles. Therefore, the diameter of the light beam L60 should not be increased as the size of the hologram recording medium 45 gets closer.

This harmful effect also occurs when the scanning pitch is set to be smaller than the diameter of the light beam L60. For example, FIG. 12 shows an example in which the scanning pitch in the vertical direction is set to be equal to the diameter of the light beam L60, and FIG. 13 shows an example in which the scanning pitch in the vertical direction is set to twice the diameter of the light beam L60. When the scanning pitch in the vertical direction (vertical scanning direction) is thus set to be equal to or larger than the diameter of the light beam, the scanning region of the i-th line and the scanning region of the (i+1)-th line do not overlap each other, however, if the scanning pitch is less than the diameter of the light beam, an overlapping region occurs and may become a factor that causes speckles as described above.

Moreover, a low scanning speed may also become a factor that causes speckles. For example, if scanning is carried out at a low speed in which it takes an hour to scan one line, in terms of visual time resolution of humans, this is the same as not scanning, and speckles are recognized. The reason for speckle reduction by light beam scanning is that the incidence angle of light to be irradiated onto the respective portions of the light receiving surface R is multiplexed by time as described above. Therefore, to sufficiently obtain the speckle reducing effect by beam scanning, the time during which the same interference conditions that causes speckles are maintained is reduced to be shorter than the visual time resolution of humans.

Generally, the limit of visual time resolution of humans is approximately $1/20$ to $1/30$ seconds, and by presenting 20 to 30 frames or more of still images per second, they are recognized as a smooth moving image by humans. By taking this into consideration, when the diameter of the light beam is represented as d, by carrying out scanning at a scanning speed (speed of 20d to 30d per second) for advancing a distance of d or more per $1/20$ to $1/30$ seconds, a sufficient speckle reducing effect is obtained.

<3-3> Hologram Recording Medium

The detailed production process of the hologram recording medium 45 is as described in Section 1 above. Specifically, the hologram recording medium 45 to be used in the present invention is a medium that records an image of the scatter plate 30 as a hologram by using reference light that converges on the specific convergence point C. Therefore, herein, a description is given of a detailed mode of a hologram recording medium to be suitably utilized in the present invention.

There are some physical modes of holograms. The inventor of the present invention considers that a volume hologram is most preferably utilized in the present invention. In particular, a volume hologram using a photopolymer is optimally used.

Generally, a hologram utilized as an anticounterfeit seal on a cash card and a cash voucher, etc., is called a surface relief (embossed) hologram, and hologram interference fringes are recorded by the surface uneven structure. Of course, the hologram recording medium 45 that records the image of the scatter plate 30 as a surface relief hologram (generally called a holographic diffuser) can also be utilized for carrying out the present invention. However, in the case of this surface relief hologram, scattering by the surface uneven structure may become a new factor that causes production of speckles, and therefore, this is not preferable from the viewpoint of speckle reduction. In the case of a surface relief hologram, multi-order diffracted light is generated, so that the diffraction efficiency is deteriorated, and further, the diffraction performance (performance that determines how large the diffraction angle can be increased) is also limited.

On the other hand, in the case of a volume hologram, hologram interference fringes are recorded as refractive index distribution inside a medium, so that the hologram is not affected by scattering by the surface uneven structure. Generally, the diffraction efficiency and diffraction performance of a volume hologram are better than those of a surface relief hologram. Therefore, when carrying out the present invention, a medium that records the image of the scatter plate 30 as a volume hologram is optimally utilized as the hologram recording medium 45.

However, even in the case of a volume hologram, if it is of a type that is recorded by utilizing a photosensitive medium including a silver halide material, scattering by silver halide particles may become a new factor that produces speckles, so that it is preferable to avoid use of this type. For this reason, the inventor of the present invention considers that a volume hologram using a photopolymer is optimum as the hologram recording medium 45 to be used in the present invention. A detailed chemical composition of such a volume hologram using a photopolymer is described in, for example, Japanese Patent No. 2849021.

However, in terms of mass production, a surface relief hologram is better than a volume hologram. For a surface relief hologram, an original plate having an uneven structure on the surface is prepared, and by press working by using this original plate, mass production of media is possible. Therefore, when it is demanded to reduce the production cost, a surface relief hologram is utilized.

As a physical mode of a hologram, an amplitude modulation hologram formed by recording interference fringes as a shading pattern on a plane has become widely popular. However, this amplitude modulation hologram is low in diffraction efficiency, and light absorption occurs at a dark pattern portion, so that when it is utilized in the present invention, sufficient illumination efficiency cannot be secured. However, in the production process thereof, a simple method in which a shading pattern is printed on a plane can be adopted, and this is advantageous in terms of production cost. Therefore, an amplitude modulation hologram can also be adopted in the present invention depending on the use.

In the recording method shown in FIG. 1, a so-called Fresnel type hologram recording medium is created, however, a hologram recording medium of a Fourier transform type obtained by recording the scatter plate 30 through a lens can also be created. In this case, as appropriate, the illumination efficiency may be improved by providing a lens on the optical path of the diffracted light L45 to condense light, however, even without a lens, a function as an illumination apparatus can be sufficiently performed.

<<<Section 4. Modification of Illumination Apparatus According to the Present Invention>>>

A basic embodiment of an illumination apparatus according to the present invention has been described so far. When carrying out this basic embodiment, first, a preparation step is carried out in which a hologram recording medium 45 is created by recording the image 35 of the scatter plate 30 as a hologram on the recording medium 40, and an illumination step is carried out in which an illumination apparatus 100 is configured by using the hologram recording medium 45 created in the preparation step, a coherent light beam L60 is irradiated onto the hologram recording medium 45, and this light beam L60 is scanned on the hologram recording medium 45 so that the irradiation position changes with time.

In this case, in the preparation step, as shown in FIG. 1, coherent illumination light L12 is irradiated onto the scatter plate 30, and scattered light L30 obtained from the scatter plate 30 is used as object light Lobj. Then, coherent light L23 that is irradiated onto the recording medium 40 along an optical path and has the same wavelength as that of the illumination light L12 is used as reference light Lref. Then, by recording interference fringes formed by the object light Lobj and the reference light Lref on the recording medium 40, the hologram recording medium 45 is created. In the illumination step, as shown in FIG. 9, scanning is carried out so that a light beam L60 with the same wavelength as that of the reference light Lref (or an approximate wavelength capable of reproducing a hologram) advances toward an irradiation position on the hologram recording medium 45 by passing through an optical path along the optical path of the reference light Lref (in other words, the light beam L60 is given from a direction optically conjugate toward the reference light Lref), and reproduction light of the image 35 of the scatter plate 30, obtained from the hologram recording medium 45, is used as illumination light.

Here, a description is given of several modifications of the above-described basic embodiment.

<4-1> Hologram Recording Medium on the Assumption of One-dimensional Scanning

In the process of creating the hologram recording medium shown in FIG. 1, the parallel light flux L22 is condensed by the convex lens 23 (lens having a focal point at the position of the convergence point C) and irradiated as reference light Lref onto the medium 40. Specifically, along a side surface of a cone whose tip is on the convergence point C (theoretically, innumerable cones with radiuses different from each other are present), the image of the scatter plate 30 is recorded by using the reference light Lref that three-dimensionally converges on the convergence point C.

The use of the reference light Lref that three-dimensionally converges is on the assumption that the light beam L60 is three-dimensionally scanned (beam is scanned by combining turning around the V axis and turning around the W axis of the reflecting mirror) so that its optical path three-dimensionally diverges from the scanning origin B in the illumination apparatus shown in FIG. 9. Three-dimensional scanning of the light beam L60 is for two-dimensionally scanning the irradiation position of the light beam on the hologram recording medium 45 (for scanning in the horizontal direction and scanning in the vertical direction in FIG. 12).

Figure 16:
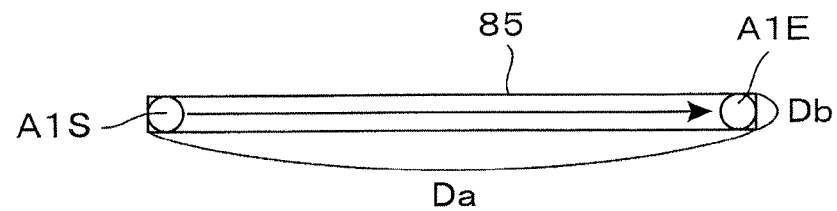
FIG. 16 is a plan view showing a scanning mode of a light beam when a band-shaped hologram recording medium 85 is used.

However, the scanning of the irradiation position of the light beam on the hologram recording medium 45 does not necessarily have to be two-dimensionally scanned. For example, in FIG. 14, an example of scanning of the light beam only in the horizontal direction is illustrated. Thus, on the assumption that the irradiation position of the light beam is one-dimensionally scanned, it is rational that the hologram recording medium is also created on the same assumption. In detail, on the assumption of one-dimensional scanning, instead of creating the hologram recording medium 45 as shown in FIG. 14, creating a band-shaped hologram recording medium 85 shown in FIG. 16 is sufficient.

When this hologram recording medium 85 is used, as scanning by the light beam scanning device 60, scanning of one line from the start region A1S on the left end to the end region A1E on the right end is repeated. In this case, scanning of one line from the left to the right may be repeated, or reciprocatory scanning may be carried out in such a manner that scanning from the right to the left is carried out after scanning from the left to the right. When the light beam L60 to be used is a laser beam having a circular section with a diameter of 1 mm, the longitudinal width Db=1 mm of the hologram recording medium 85 shown in FIG. 16 is sufficient. Therefore, as compared with the case where the hologram recording medium 45 shown in FIG. 14 is used, further space-saving is realized, and the apparatus can be downsized as a whole.

Figure 17:
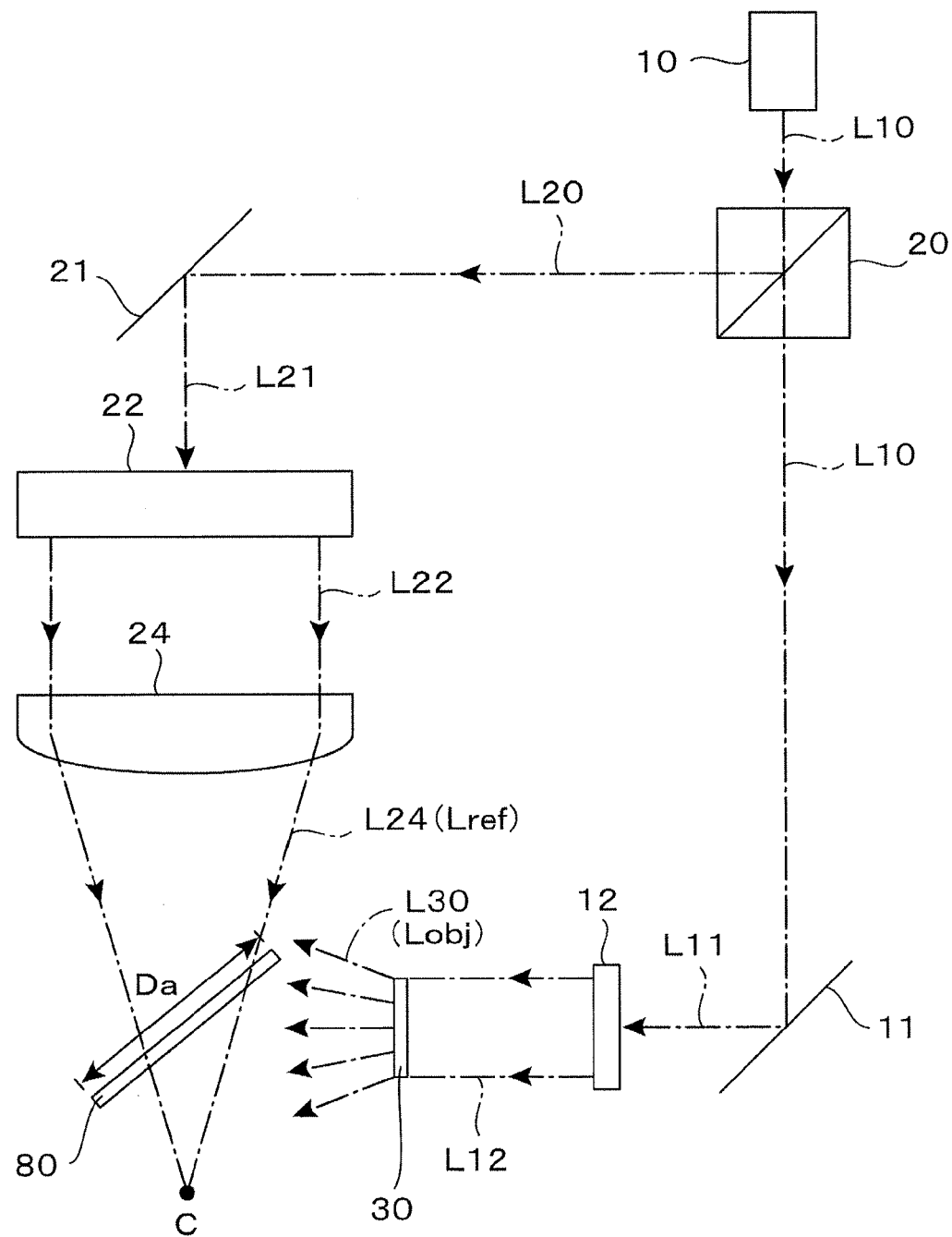
FIG. 17 is an optical system arrangement drawing showing a process of creating the band-shaped hologram recording medium 85 shown in FIG. 16.

The hologram recording medium 85 on the assumption of one-dimensional scanning can be created by using the optical system shown in FIG. 1, however, instead of this, it may also be created by using the optical system shown in FIG. 17. In the optical system shown in FIG. 17, the convex lens 23 in the optical system shown in FIG. 1 is replaced by a cylindrical lens 24, and the hologram photosensitive medium 40 having a rectangular plane is replaced by a hologram photosensitive medium 80 having a long and narrow band-shaped plane, and other components are the same. The lateral width Da of the hologram photosensitive medium 80 is equal to the lateral width of the hologram photosensitive medium 40, however, the longitudinal width Db (width in the direction perpendicular to the paper surface in FIG. 17) is approximate to the diameter of the light beam (approximately 1 mm in the example described above).

The cylindrical lens 24 is a lens having a columnar surface having a central axis perpendicular to the paper surface of FIG. 17, and in FIG. 17, when a condensing axis passing through the convergence point C and perpendicular to the paper surface is defined, the cylindrical lens performs a function of condensing the parallel light flux L22 on the condensing axis. However, due to the properties of the cylindrical lens, light refraction occurs only within a plane parallel to the paper surface, and does not occur in the direction perpendicular to the paper surface. In other words, focusing attention on a plane (paper surface of FIG. 17) orthogonal to the central axis of the column of the cylindrical lens and including the convergence point C, the light L24 that two-dimensionally converges along this plane is given as reference light Lref.

Thus, in the present application, "light converges on the convergence point C" means not only three-dimensional convergence by the convex lens 23 shown in the optical system in FIG. 1, but also two-dimensional convergence by the cylindrical lens 24 shown in the optical system in FIG. 17. To create the hologram recording medium 85 on the assumption of one-dimensional scanning as illustrated in FIG. 16, as shown in the optical system in FIG. 17, by using a cylindrical lens 24 having a columnar surface whose central axis is parallel to a condensing axis passing through the convergence point C (axis passing through the convergence point C and perpendicular to the paper surface in the example shown in the drawing), a light flux L22 of substantially parallel coherent light is condensed on the condensing axis, and by using light L24 that two-dimensionally converges on the convergence point C as reference light Lref, the hologram image of the scatter plate 30 is recorded.

<4-2> Hologram Recording Medium Consisting of CGH

The process of creating a hologram recording medium described above adopts a pure optical method in which light is actually irradiated onto a hologram photosensitive medium and interference fringes generated there are fixed by chemical change of the photosensitive medium. On the other hand, recently, a method in which this optical process is simulated on a computer, information on interference fringes is calculated by carrying out an arithmetic operation, and results of the calculation are fixed onto a medium by a certain physical means, has been established. A hologram created by this method is generally called a computer generated hologram (CGH).

The hologram recorded on the hologram recording medium used in the present invention may be such a computer generated hologram. Specifically, instead of creating a hologram recording medium by the optical process described in Section 1, a simulation operation using virtual object light from a virtual scatter plate and virtual reference light is carried out to obtain information on interference fringes generated on a virtual recording surface, and this information is recorded on a medium by a physical method, whereby creating a computer generated hologram.

Figure 18:
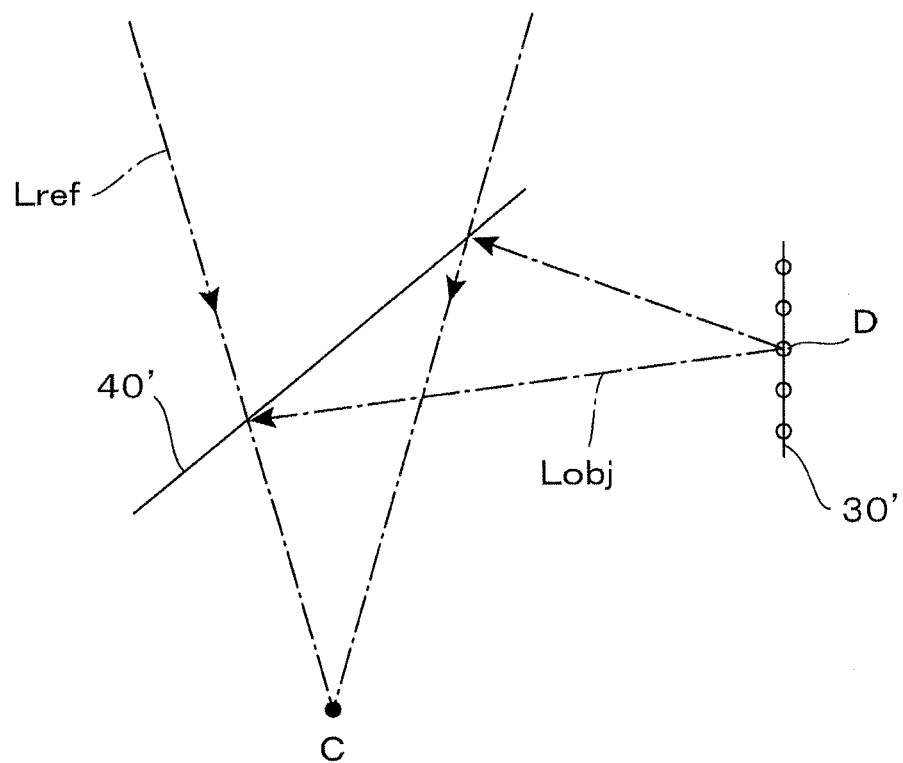
FIG. 18 is a side view showing the principle of creating a hologram recording medium as a component of an illumination apparatus according to the present invention by means of CGH.

FIG. 18 is a side view showing the principle of creating a hologram recording medium as a component of the illumination apparatus according to the present invention by means of CGH, and illustrates a method of simulating the optical phenomenon shown in FIG. 4 on a computer. Here, the virtual scatter plate 30' shown in FIG. 18 corresponds to the real scatter plate 30 shown in FIG. 4, and the virtual recording surface 40' shown in FIG. 18 corresponds to the real hologram photosensitive medium 40 shown in FIG. 4. The illustrated object light Lobj is virtual light emitted from the virtual scattered plate 30', and the illustrated reference light Lref is virtual light with the same wavelength as that of the object light Lobj. This method is completely the same as the method described above in that reference light Lref is light that converges on the convergence point C. At the respective points on the recording surface 40', information on interference fringes of the virtual object light Lobj and reference light Lref is arithmetically operated.

Figure 19:
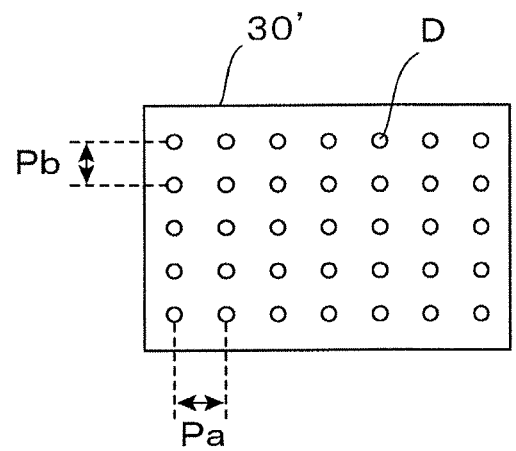
FIG. 19 is a front view of a virtual scatter plate 30' shown in FIG. 18.

As the virtual scatter plate 30', for example, a fine three-dimensional shape model expressed by a polygon, etc., can be used, however, here, a simple model including a large number of point light sources D aligned in a grid pattern on a plane is used. FIG. 19 is a front view of the virtual scatter plate 30' shown in FIG. 18, and small white circles indicate point light sources D, respectively. As illustrated, a large number of point light sources D are aligned in a grid pattern at a pitch Pa horizontally and a pitch Pb vertically. The pitches Pa and Pb are parameters that determine the surface roughness of the scatter plate.

The inventor of the present invention set the pitches Pa and Pb of the point light sources D to approximately the size of 10 µm and arithmetically operated information on interference fringes generated on the recording surface 40', and based on the results, formed an uneven pattern on the real medium surface to create a surface relief CGH. Then, when an illumination apparatus 100 was configured by using this CGH as the hologram recording medium 45, an excellent illumination environment in which speckles were reduced was obtained.

Figures 20, 21:
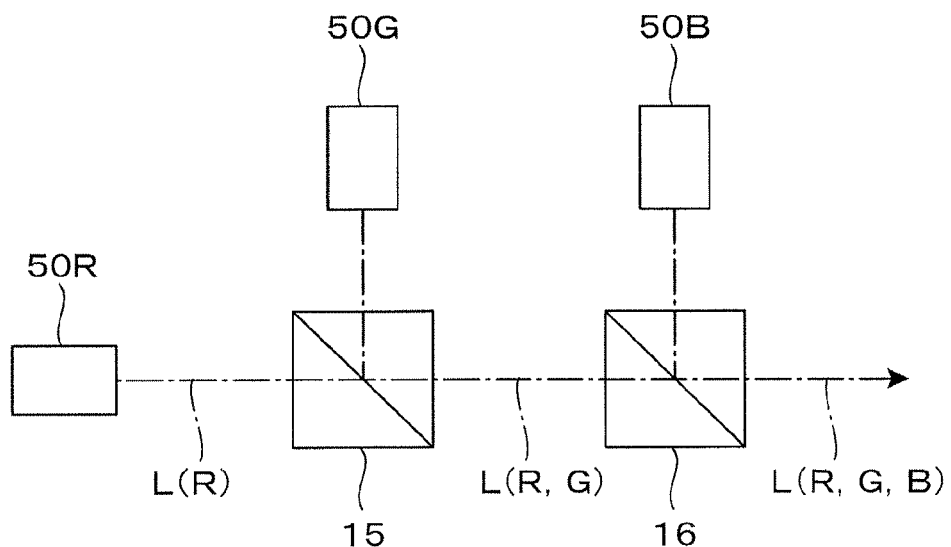
FIG. 20 is a table showing experimental results in which a speckle reducing effect is obtained according to the present invention.
FIG. 21 is a view showing a configuration example of a light source when white illumination is carried out with the illumination apparatus according to the present invention.

FIG. 20 is a table showing experiment results in which a speckle reducing effect was obtained by the present invention. Generally, a method using numerical values called speckle contrasts (unit: %) as parameters showing the degrees of speckles generated on the light receiving surface is proposed. The speckle contrast is defined as a numerical value obtained by dividing the standard deviation in brightness unevenness actually generated under conditions that should normally have a uniform brightness distribution by a brightness average value. As the speckle contrast value becomes larger, the degree of speckle generation on the light receiving surface becomes higher, and a spot-like pattern of brightness unevenness is more conspicuously presented to an observer.

The table of FIG. 20 shows results of measurement of speckle contrasts on the light receiving surface R of four measuring systems in which the illuminating object 70 is illuminated by utilizing the illumination apparatus 100 shown in FIG. 10 and a conventional apparatus in contrast with the illumination apparatus 100. The measurement examples 1 to 3 each show results obtained by using the same DPSS laser device capable of emitting green laser light as the coherent light source 50. A diffusion angle of the hologram recording media used in the measurements (a maximum view angle from a point on the hologram recording media toward the reproduction image 35) is set to 20° in both the examples 2 and 3.

First, the measurement result shown as the measurement example 1 was obtained by using, instead of the illumination apparatus 100, a measuring system in which the light beam L50 from the coherent light source 50 is expanded to become a parallel light flux by the beam expander and this parallel light flux (laser parallel light) is directly irradiated onto the light receiving surface R. In this case, as shown in the table, a speckle contrast of 20.1% was obtained. This shows a state where a spot-like pattern of brightness unevenness is very clearly observed by the naked eye, and is on a level unsuitable for practical room illumination.

On the other hand, the measurement results shown as measurement examples 2 and 3 were both obtained by carrying out illumination by utilizing the illumination apparatus 100 shown in FIG. 10. Here, the measurement example 2 shows a result obtained by utilizing a volume hologram created by an optical method as the hologram recording medium 45, and the measurement example 3 shows a result obtained by utilizing a surface relief CGH described above as the hologram recording medium 45. In these results, speckle contrasts lower than 4% were obtained, and this shows an extremely excellent state where a pattern of brightness unevenness is hardly observed by the naked eye (it is generally said that a feeling of discomfort is not given to an observer if the speckle contrast is not more than 5%). Therefore, in both of the case where a volume hologram created by an optical method is utilized and the case where a surface relief CGH is utilized as the hologram recording medium 45, a practically satisfactory illumination apparatus can be configured. The reason why a result (3.0%) better than the result (3.7%) of the measurement result 3 was obtained in the measurement example 2 is considered that the resolution of the real scatter plate 30 that becomes the original image is higher than the resolution of the virtual scatter plate 30' (a collection of point light sources shown in FIG. 19).

The measurement result shown as the last measurement example 4 was obtained by using a measuring system in which light from a green LED light source is directly irradiated onto the light receiving surface R instead of using the illumination apparatus 100. Originally, an LED light source is not a coherent light source, so that it is not necessary to consider the problem of occurrence of speckles, and as shown in the table, an excellent result of a speckle contrast of 4.0% was obtained. A reason why the result of the measurement example 4 using incoherent light is inferior to the results of measurement examples 2 and 3 using coherent light is considered that brightness unevenness occurred in light itself emitted by the LED light source.

<4-3> Illumination in a Plurality of Colors

The embodiments described above are examples of monochromatic illumination apparatuses using a monochromatic laser light source as a coherent light source. On the other hand, by using a plurality of laser light sources that generate laser lights each with different wavelengths, an illumination apparatus capable of making illumination synthesized with a plurality of colors can be configured.

In detail, in the illumination apparatus 100 shown in FIG. 9, as the coherent light source 50, a device including n laser light sources that generate monochromic laser beams with different wavelengths, and a light synthesizer that produces a synthesized light beam by synthesizing the laser beams generated by the n laser light sources, is used. Of course, the image 35 of the scatter plate 30 is recorded in advance as n holograms on the hologram recording medium 45 so that reproduction images are obtained by the respective laser beams generated by the n laser light sources.

FIG. 21 is a configuration view showing an example of this device. This device has a function of producing a white light beam by synthesizing three primary colors of red, green, and blue. Specifically, a red laser beam L(R) generated by a red laser light source 50R and a green laser light beam L(G) generated by a green laser light source 50G are synthesized by a dichroic prism 15, and further synchronized with a blue laser beam L(B) generated by a blue laser light source 50B by a dichroic prism 16, and accordingly, a white synthesized light beam L (R, G, B) is produced. On the other hand, the light beam scanning device 60 bends the synthesized light beam L (R, G, B) thus produced and scans it on the hologram recording medium 45. From the hologram recording medium 45, diffracted lights of the respective color components of R, G, and B are obtained, reproduction images 35 of the respective color components of R, G, and B are produced at the same position, and accordingly, a white reproduction image is obtained.

To create a hologram recording medium on which an image of the scatter plate 30 is recorded by using lights in three colors of R, G, and B, for example, a process of recording a hologram is carried out by using a hologram photosensitive medium on which a pigment photosensitive to light in R color, a pigment photosensitive to light in G color, and a pigment photosensitive to light in B color are uniformly distributed, and the above-described synthesized light beam L (R, G, B). A hologram photosensitive medium having a three-layer structure including lamination of a first photosensitive layer photosensitive to light in R color, a second photosensitive layer photosensitive to light in G color, and a third photosensitive layer photosensitive to light in B color may also be used. Alternatively, it is also possible that these three photosensitive layers are prepared as separate media, and a hologram is recorded on these layers separately by using lights in corresponding colors, and last, these three layers are stuck together to form a hologram recording medium having a three-layer structure.

<4-4> Image Display Apparatus

A mode utilizing the present invention as an illumination apparatus has been described so far, and an illumination apparatus according to the present invention can also be utilized as an image display apparatus. For example, an illumination use mode in which the upper surface of the table 75 is illuminated by an illumination apparatus 100 attached to a ceiling is illustrated in FIG. 11. In this case, on the light receiving surface R, the reproduction image 35 of the scatter plate 30 is formed, and an illumination spot is formed by this reproduction image 35.

Figure 22:
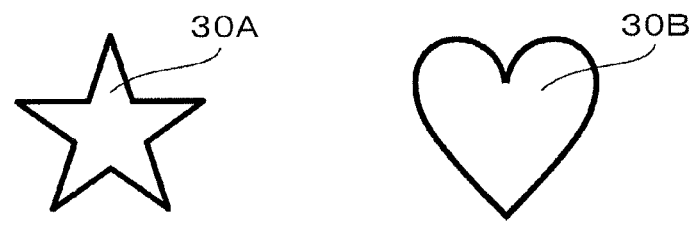
FIG. 22 is a plan view showing variations of a scatter plate used for creating the illumination apparatus according to the present invention.

By thus recognizing the illumination apparatus 100 as an apparatus that produces the reproduction image 35 of the scatter plate 30, it is understood that this apparatus has a function as an image display apparatus. For example, when a rectangular plate is used as the scatter plate 30 to be recorded in the preparation step, the contour of the illumination spot formed on the upper surface of the table 75 becomes rectangular, however, when a circular plate is used, the contour of the illumination spot becomes circular. Therefore, for example, as shown in FIG. 22, by creating the hologram recording medium 45 by using a scatter plate 30A having a star-shaped contour or a scatter plate 30B having a heart-shaped contour, an illumination spot having a star-shaped or heart-shaped contour is obtained. This means that the illumination apparatus 100 functions as an image display apparatus that displays a star-shaped image or a heart-shaped image.

Incidentally, the form of an image to be displayed is determined not only by the contour of the scatter plate. For example, as shown on the upper stage of FIG. 23, a general rectangular scatter plate 30 is prepared, and as shown on the lower left stage of FIG. 23, a transmissive film 33A on which a star-shaped image is drawn is prepared. This transmissive film 33A has properties of transmitting light on the inner side of the star shape and shielding light on the outer side (hatched region) of the star shape. When this transmissive film 33A is overlaid on the upper surface of the scatter plate 30 and recording is carried out with the optical system shown in FIG. 1, as in the case where the scatter plate 30A having a star-shaped contour shown in FIG. 22 is used, a star-shaped scatter plate is recorded, so that when reproducing it, a star-shaped illumination spot is obtained.

Figure 23:
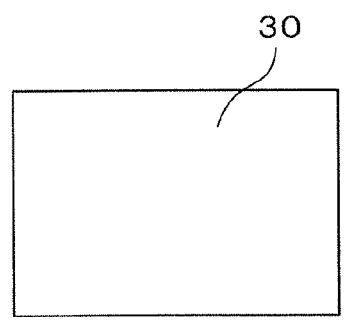
FIG. 23 is a plan view showing transmissive films to be used when the illumination apparatus according to the present invention is utilized as an image display apparatus.
Figure 23:
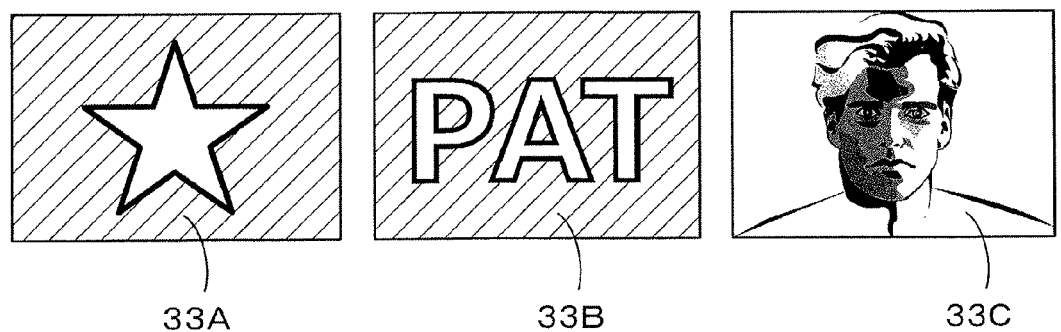

Of course, as shown on the lower center stage of FIG. 23, by using a transmissive film 33B on which a character string "PAT" is drawn, illumination spots in the shapes of the respective characters are obtained. In the use mode shown in FIG. 11, the character string "PAT" stands out on the upper surface of the table 75. Further, as shown at the lower right stage of FIG. 23, by using a transmissive film 33C on which a gradation image (for example, black-and-white photo) having shading information is printed, the gradation image can be displayed on the upper surface of the table 75.

When the illumination apparatus is thus utilized as an image display apparatus, for clear image display, the light receiving surface R must be disposed at a production position of the reproduction image 35. Therefore, to configure an image display apparatus capable of displaying images as shown on the lower stage of FIG. 23, the illumination apparatus 100 described above and a display medium 70 having a light receiving surface R to be illuminated by the illumination apparatus 100 are prepared, the image 35 of the scatter plate 30 covered by a transmissive film on which an image is drawn is recorded on the hologram recording medium 45, and the light receiving surface R is disposed at a position at which the reproduction image 35 of the scatter plate 30 is formed.

<4-5> Geometric Variation for Creating Hologram Recording Medium

In Section 1, a method for recording a hologram image of the scatter plate 30 on the hologram photosensitive medium 40 is described with reference to FIG. 1. This method is a method for creating a reflection type hologram recording medium by using reference light that converges on the convergence point C, and the geometric arrangement of necessary components is as shown in the side view of FIG. 24.

Figure 24:
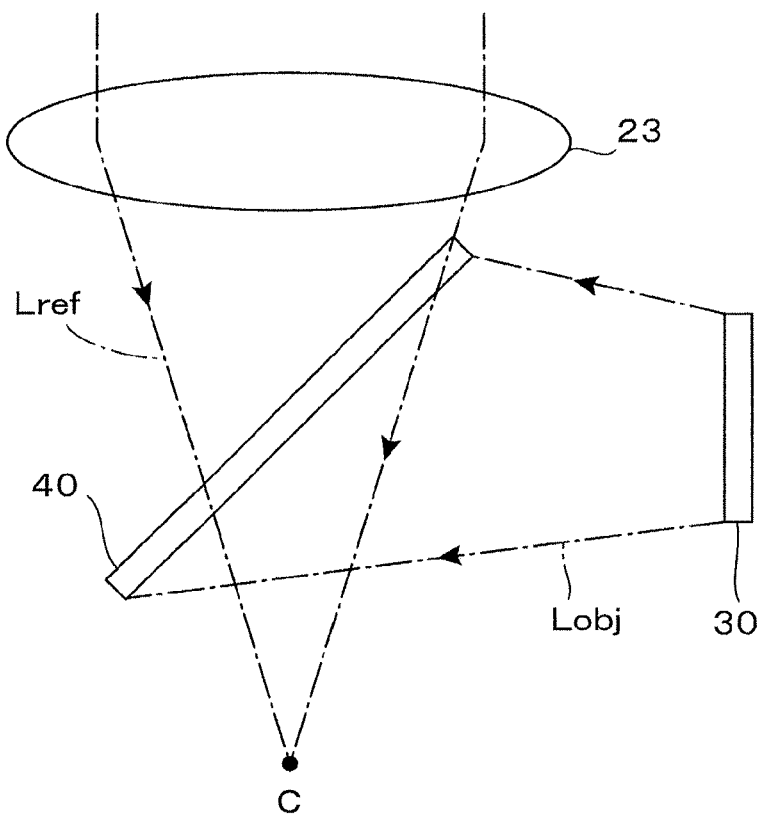
FIG. 24 is a side view showing a process of creating a reflection type hologram recording medium by using convergent reference light.
Figure 25:
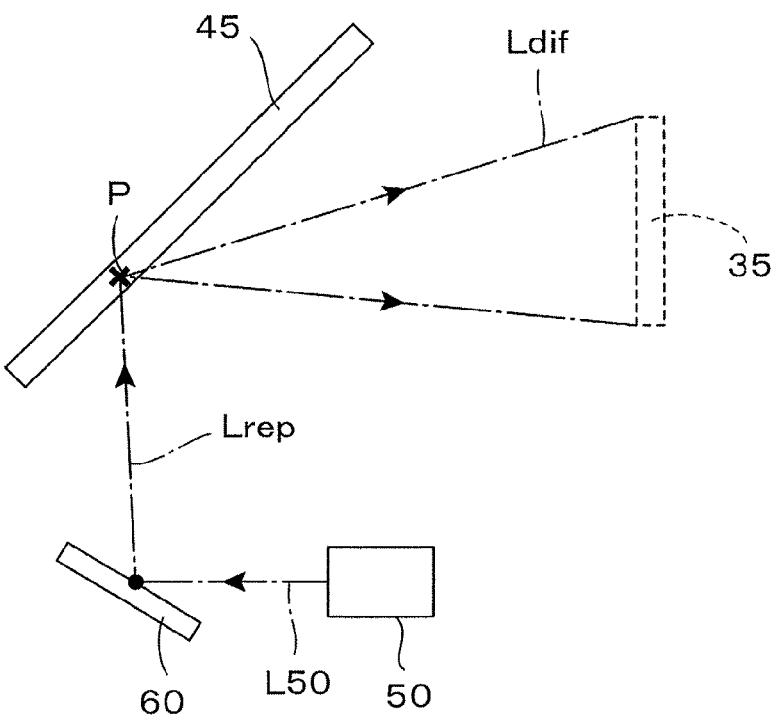
FIG. 25 is a side view showing a reproduction process of the reflection type hologram recording medium 45 created by the method shown in FIG. 24.

In the example shown in FIG. 24, the convergent reference light Lref advancing toward the convergence point C is produced by the convex lens 23, and the medium 40 is disposed between the convex lens 23 and the convergence point C. The medium 40 is disposed obliquely as illustrated, and onto the lower surface side thereof, object light Lobj from the scatter plate 30 is irradiated. The hologram recording medium created by this method becomes a reflection type medium. Specifically, when carrying out reproduction, as shown in FIG. 25, a light beam that functions as illumination light for reproduction Lrep is irradiated onto the lower surface side of the medium 45, and the reproduction image 35 is produced by reflected diffracted light Ldif from the point P.

Thus, in the examples described above, a hologram recorded on the hologram recording medium 45 is a reflection type hologram, and reflected diffracted light of a light beam is used as illumination light. On the other hand, it is also possible that a hologram recorded on the hologram recording medium 45 is a transmission type hologram, and transmitted diffracted light of the light beam is used as illumination light.

Figure 26:
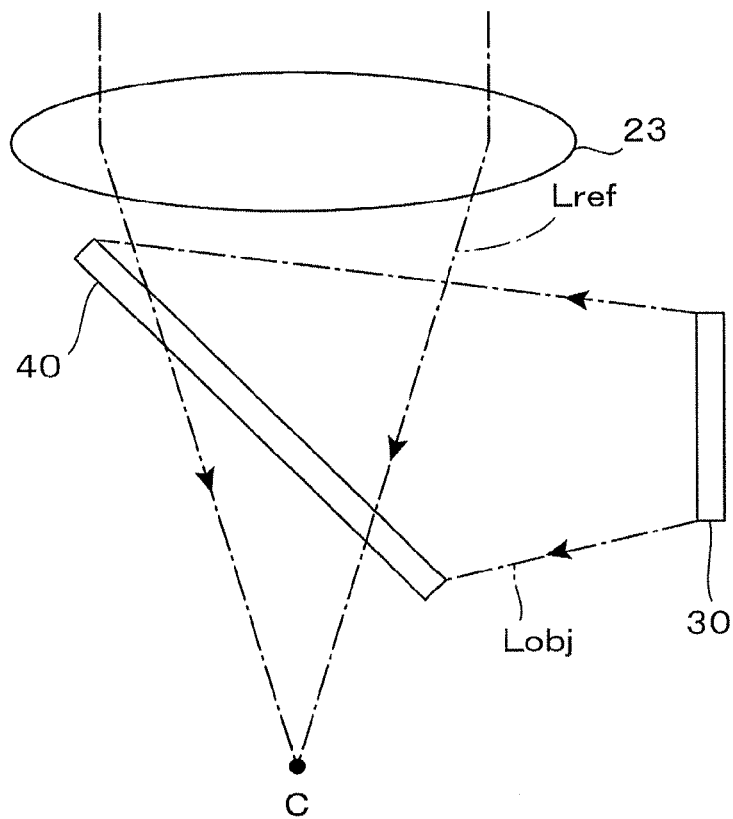
FIG. 26 is a side view showing a process of creating a transmission type hologram recording medium by using convergent reference light.
Figure 27:
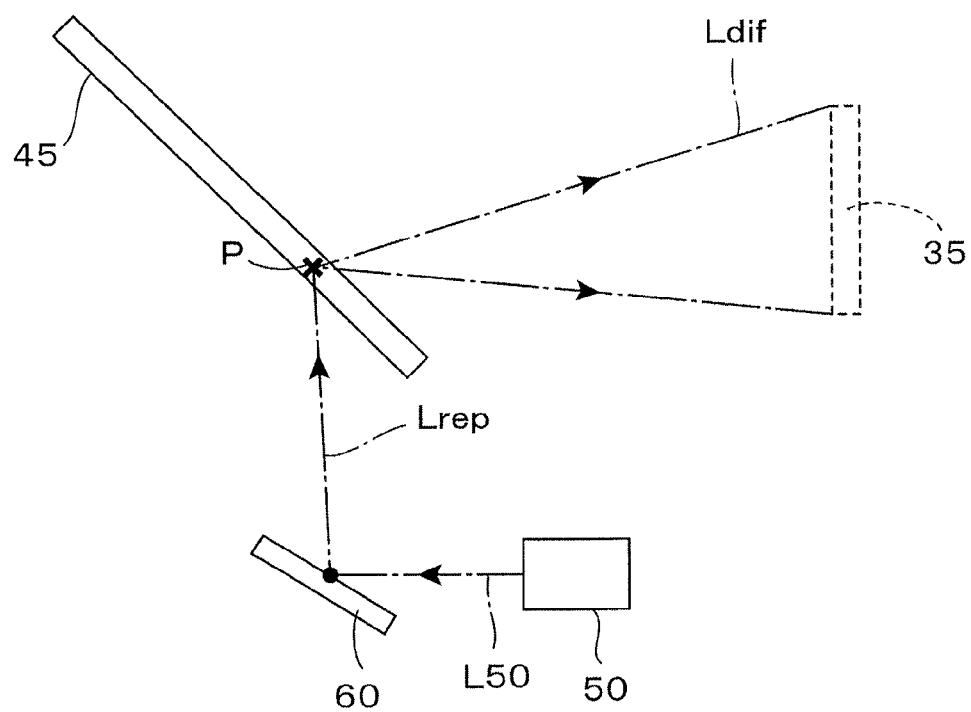
FIG. 27 is a side view showing a reproduction process of the transmission type hologram recording medium 45 created by the method shown in FIG. 26.

FIG. 26 is a side view showing geometric arrangement when creating such a transmission type hologram. The difference from the arrangement shown in FIG. 24 is the orientation of the medium 40. In the method for creating a reflection type hologram shown in FIG. 24, reference light Lref is irradiated onto the upper surface of the medium, and object light Lobj is irradiated onto the lower surface of the medium. By thus irradiating the reference light and the object light onto surfaces on the sides opposite to each other, a reflection type hologram can be recorded. On the other hand, in the method shown in FIG. 26, both of the reference light Lref and the object light Lobj are irradiated onto the upper surface of the medium 40. Thus, by irradiating reference light and object light from the same side, a transmission type hologram can be recorded. Specifically, when carrying out reproduction, as shown in FIG. 27, a light beam functioning as illumination light for reproduction Lrep is irradiated onto the lower surface side of the medium 45, and the reproduction image 35 is produced by transmitted diffracted light Ldif from the point P.

Although the examples described above are methods for creating a reflection type or transmission type hologram recording medium by using reference light that converges on the convergence point C, a reflection type or transmission type hologram recording medium can also be created by using reference light that diverges from the convergence point C instead. However, in this case, a preparatory hologram recording medium must be created in advance. Hereinafter, a description is given of processes for carrying out this method in order.

Figure 28:
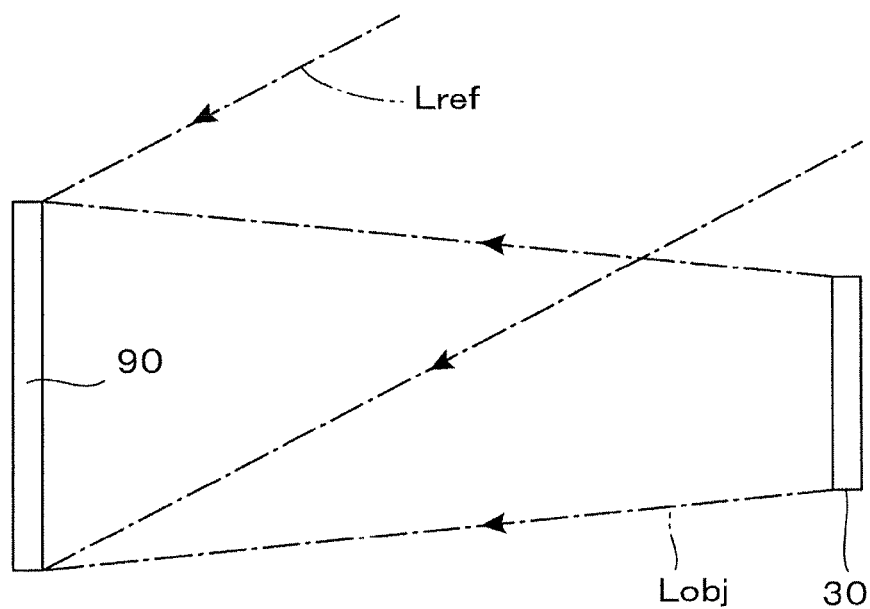
FIG. 28 is a side view showing a preparation process when a hologram recording medium is created by using divergent reference light.

First, as shown in FIG. 28, the preparatory hologram photosensitive medium 90 and the scatter plate 30 are disposed, and parallel reference light Lref is irradiated onto the medium 90 obliquely from the upper right as illustrated. Then, interference fringes generated by the object light Lobj from the scatter plate 30 and the reference light Lref are recorded on the medium 90. Thus, when carrying out recording, by irradiating object light and reference light from the same side, a transmission type hologram is recorded. Here, the medium 90 onto which a hologram is thus recorded is referred to as a preparatory hologram recording medium 95.

Figure 29:
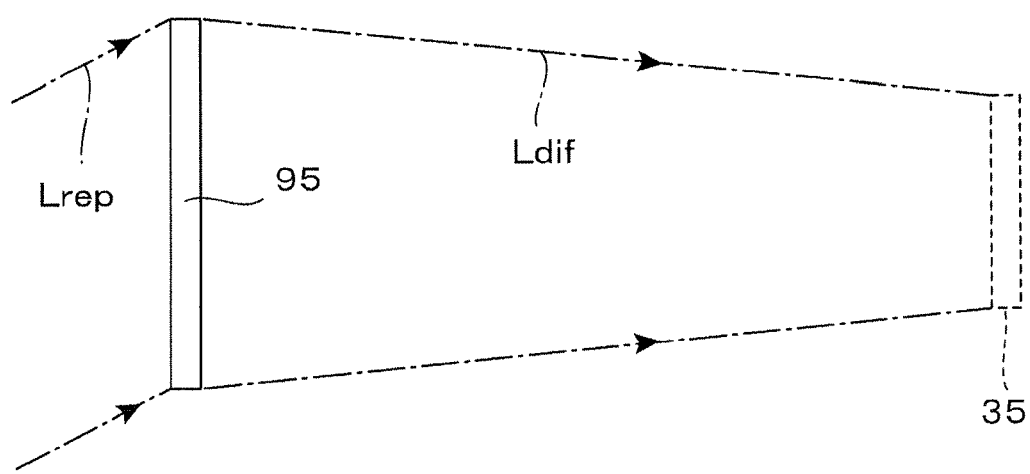
FIG. 29 is a side view showing a reproduction process of the preparatory hologram recording medium 95 created in the preparation process shown in FIG. 28.

FIG. 29 is a side view showing a reproduction process of the preparatory hologram recording medium 95. As illustrated, when parallel illumination light for reproduction Lrep is irradiated obliquely onto the medium 95 from the lower left, by transmitted diffracted light Ldif, the reproduction image 35 is produced on the right side in the drawing. Here, the extension of the direction of the illumination light for reproduction Lrep matches the direction of the reference light Lref shown in FIG. 28, and the production position of the reproduction image 35 matches the position at which the scatter plate 30 is disposed shown in FIG. 28.

Figure 30:
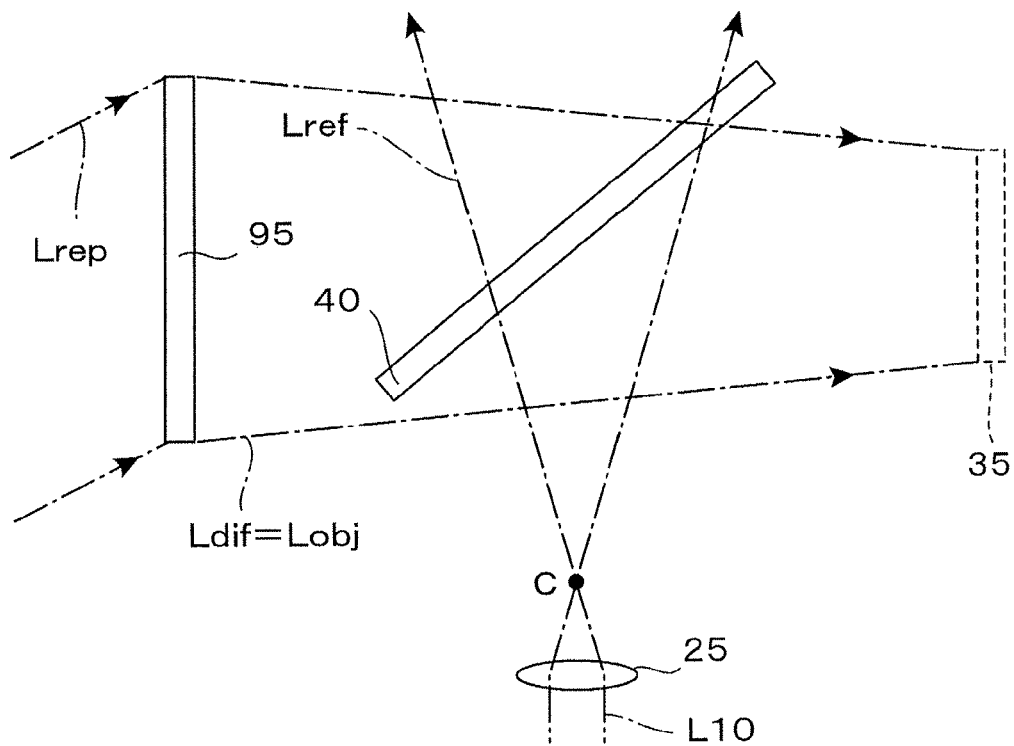
FIG. 30 is a side view showing a process of creating a reflection type hologram recording medium by using divergent reference light.

Subsequently, a process of recording an image of the scatter plate 30 on the hologram photosensitive medium 40 by using the reproduction image 35 generated by the preparatory hologram recording medium 95 as a substitute for the real scatter plate 30 is carried out. Specifically, as shown in FIG. 30, the hologram photosensitive medium 40 is disposed on the right side of the preparatory hologram recording medium 95, and by irradiating parallel illumination light for reproduction Lrep onto the medium 95 obliquely from the lower left, the reproduction image 35 is produced on the right side in the drawing. In this case, the light emitting rightward from the medium 95 is transmitted diffracted light Ldif for reproducing the reproduction image 35 and at the same time, functions as object light Lobj for the medium 40.

On the other hand, from the lower side in the drawing, divergent reference light Lref is irradiated onto the medium 40. This divergent reference light Lref is light diverging from the convergence point C (when a point light source is present on the convergence point C, light output from this point light source), and a bundle of rays diffusing in a conical shape is irradiated onto the medium 40. In the illustrated example, by producing a point light source by condensing the parallel light flux L10 on the convergence point C by the convex lens 25 having a focal point at the position of the convergence point C, divergent reference light Lref is generated. By using, for example, a microlens with a diameter of approximately 1 mm as the convex lens 25, divergent reference light Lref can be generated by utilizing a laser beam with a sectional diameter of approximately 1 mm output from the laser light source as the parallel light flux L10.

In the method shown in FIG. 30, the object light Lobj is irradiated onto the upper surface of the medium 40, and the reference light Lref is irradiated onto the lower surface of the medium 40. By thus irradiating reference light and object light onto surfaces on the sides opposite to each other, a reflection type hologram can be recorded. Therefore, the hologram recording medium 45 created by the method shown in FIG. 30 is substantially the same reflection type hologram as the hologram recording medium 45 created by the method shown in FIG. 24. Therefore, when carrying out reproduction, the geometric arrangement shown in FIG. 25 is adopted.

Figure 31:
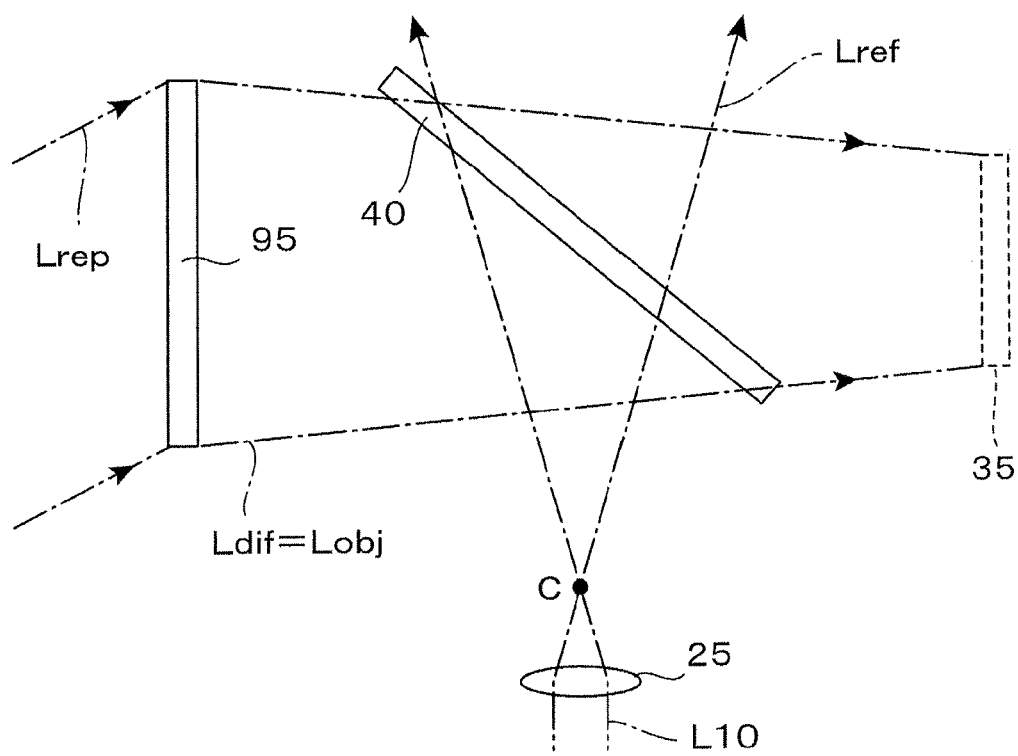
FIG. 31 is a side view showing a process of creating a transmission type hologram recording medium by using divergent reference light.

On the other hand, FIG. 31 is a side view showing an example in which a transmission type hologram is created by using divergent reference light Lref. The difference from the arrangement shown in FIG. 30 is the orientation of the medium 40. In the method for creating a reflection type hologram shown in FIG. 30, the object light Lobj is irradiated onto the upper surface of the medium, and the reference light Lref is irradiated onto the lower surface of the medium. On the other hand, in the method shown in FIG. 31, both of the object light Lobj and the reference light Lref are irradiated onto the lower surface of the medium 40. By thus irradiating reference light and object light from the same side, a transmission type hologram can be recorded. The hologram recording medium 45 created by the method shown in FIG. 31 is substantially the same transmission type hologram as the hologram recording medium 45 created by the method shown in FIG. 26. Therefore, when carrying out reproduction, the geometric arrangement shown in FIG. 27 is adopted.

Figure 32:
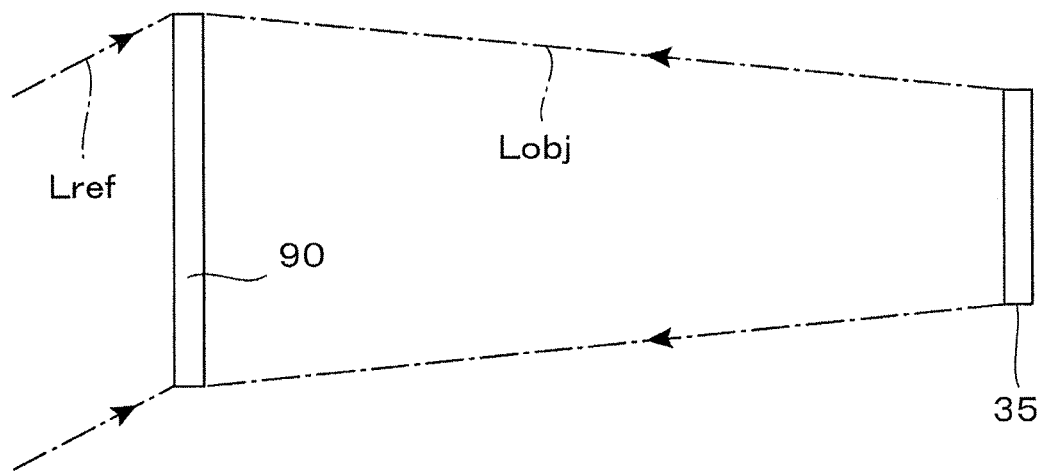
FIG. 32 is a side view showing another preparation process when a hologram recording medium is created by using divergent reference light.

In the recording processes shown in FIG. 30 and FIG. 31, the transmission type hologram created by the method shown in FIG. 28 is used as the preparatory hologram recording medium 95, however, the reflection type hologram created by the method shown in FIG. 32 may also be used as the preparatory hologram recording medium 95. In the method shown in FIG. 32, reference light Lref is irradiated onto the preparatory hologram photosensitive medium 90 from the left side, and object light Lobj is irradiated from the right side, so that the created preparatory hologram recording medium 95 is a reflection type hologram.

Figure 33:
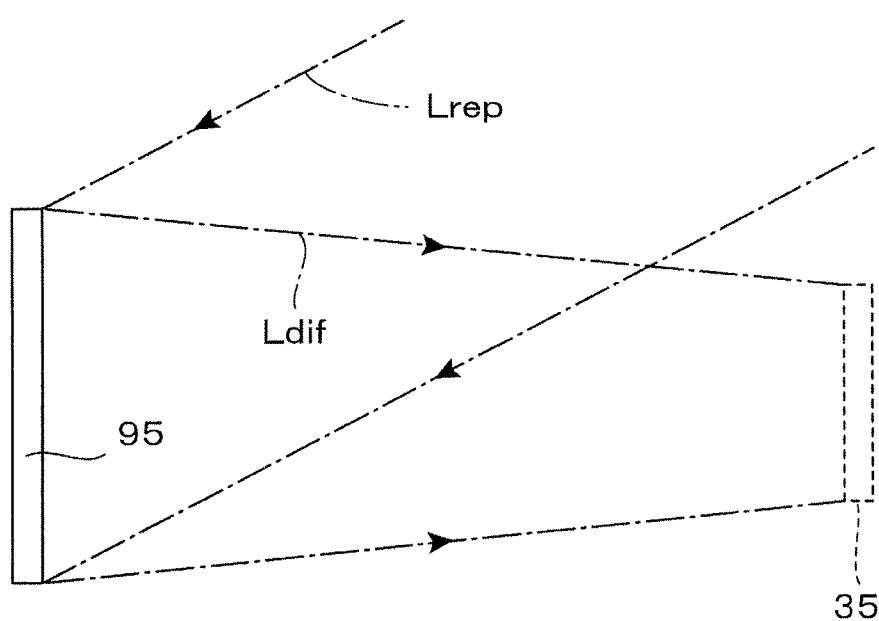
FIG. 33 is a side view showing a reproduction process of the preparatory hologram recording medium 95 created in the preparation process shown in FIG. 32.

When carrying out reproduction by using this reflection type preparatory hologram recording medium 95, as shown in FIG. 33, illumination light for reproduction Lrep is irradiated onto the medium 95 from the right side, and the reproduction image 35 is produced by the obtained reflected diffracted light Ldif. Therefore, in the process shown in FIG. 30 and FIG. 31, the illumination light for reproduction Lrep is irradiated from the right side instead of from the left side.

<4-6> Parallel-moving Scanning of Light Beam

In the embodiments described above, a method in which the light beam scanning device 60 bends a light beam at a scanning origin B and scans the bent light beam by changing the bending mode (bending direction and the amount of the bending angle) with time is adopted. However, the scanning method of the light beam scanning device 60 is not limited to the method in which a light beam is bent at the scanning origin B.

For example, a scanning method in which a light beam is moved parallel can also be adopted. However, in this case, the method for recording the scatter plate 30 on the hologram recording medium 45 must also be changed. Specifically, as in the example shown in FIG. 34, reference light Lref composed of a parallel light flux is irradiated onto the hologram photosensitive medium 40, and information on interference fringes formed by interference with object light Lobj from the scatter plate 30 is recorded. In other words, on the hologram recording medium 46 thus created, the image 35 of the scatter plate 30 is recorded as a hologram by using the reference light Lref composed of a parallel light flux.

Figure 34:
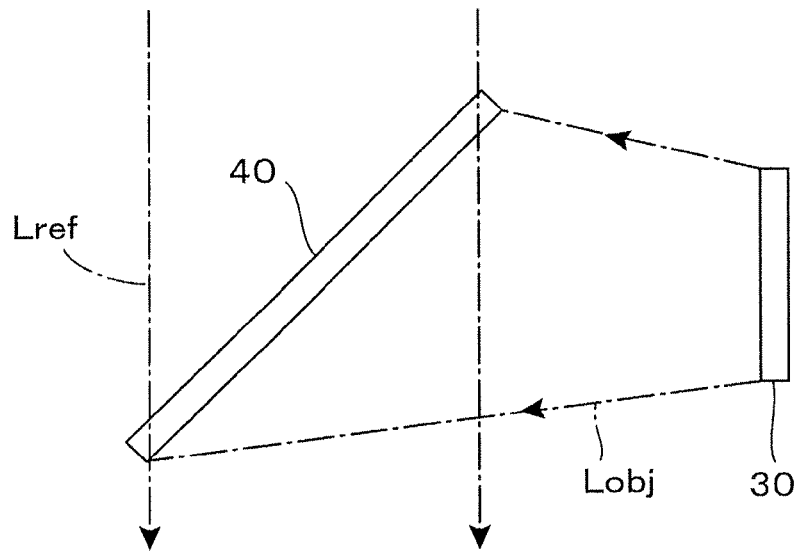
FIG. 34 is an optical system arrangement drawing showing a process of creating a hologram recording medium as a component of an illumination apparatus according to a modification of the present invention.
Figure 35:
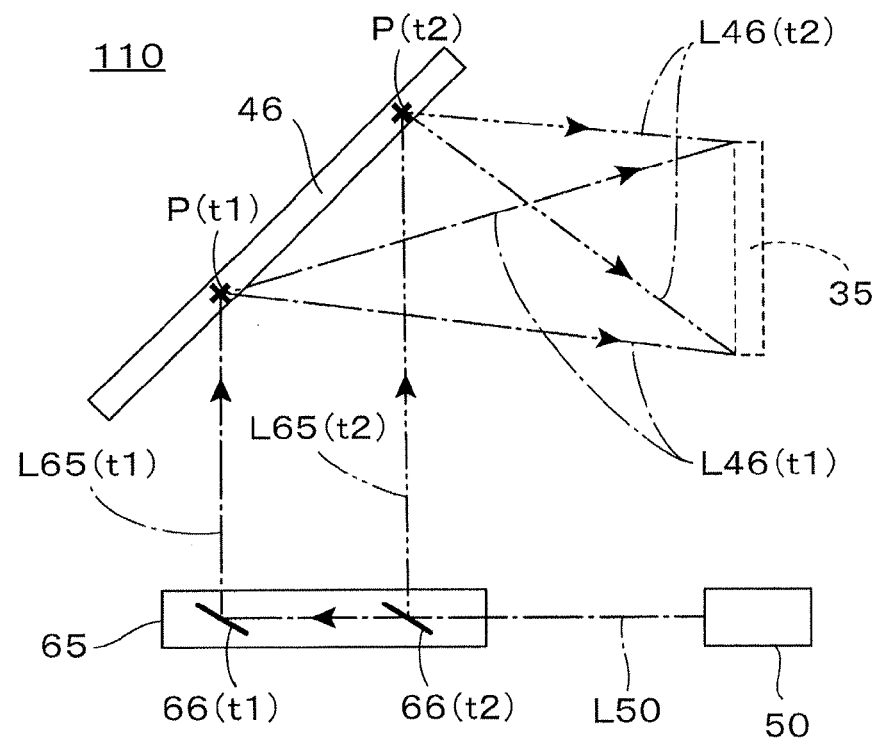
FIG. 35 is a side view showing a basic configuration of an illumination apparatus 110 according to the modification of the present invention.

FIG. 35 is a side view of an illumination apparatus 110 using the hologram recording medium 46 created by the method shown in FIG. 34. As illustrated, this illumination apparatus 110 includes the hologram recording medium 46, the coherent light source 50, and the light beam scanning device 65.

Here, the hologram recording medium 46 is a medium created by the method shown in FIG. 34, on which the image 35 of the scatter plate 30 is recorded as a hologram by utilizing reference light Lref composed of a parallel light flux. The coherent light source 50 is a light source that generates a coherent light beam L50 with the same wavelength (or an approximate wavelength capable of reproducing a hologram) as the wavelength of light (object light Lobj and reference light Lref) used for creating the hologram recording medium 46.

On the other hand, the light beam scanning device 65 has a function of irradiating the light beam L50 generated by the coherent light source 50 onto the hologram recording medium 46, and at this time, carries out scanning so that the light beam L65 is irradiated onto the hologram recording medium 46 from a direction parallel to the reference light Lref used in the creating process shown in FIG. 34. In detail, scanning is carried out so that the light beam L65 is irradiated onto the hologram recording medium 46 while being moved parallel so that the irradiation position of the light beam L65 on the hologram recording medium 46 changes with time.

The light beam scanning device 65 that carries out scanning in this manner can consist of, for example, a movable reflecting mirror 66 and a drive mechanism that drives the movable reflecting mirror 66. Specifically, as shown in FIG. 35, a movable reflecting mirror 66 is disposed at a position at which the movable reflecting mirror can receive the light beam L50 generated by the coherent light source 50, and a drive mechanism that slides the movable reflecting mirror 66 along the optical axis of the light beam L50 is provided. In practical use, the light beam scanning device 65 having a function equivalent to the function described above can consist of a micromirror device utilizing a MEMS. Alternatively, also by making the light beam L60 bent at the position of the scanning origin B by the light beam scanning device 60 shown in FIG. 9 pass through a convex lens having a focal point on the scanning origin B, a light beam that moves parallel can also be produced.

In the example shown in FIG. 35, the hologram recording medium 46 irradiated with the light beam L65 reflected by the movable reflecting mirror 66 generates diffracted light based on recorded interference fringes, and by this diffracted light, the reproduction image 35 of the scatter plate 30 is produced. The illumination apparatus 110 carries out illumination by utilizing the reproduction light thus obtained of the reproduction image 35 as illumination light.

In FIG. 35, for convenience of description, the position of the light beam at the timing t1 is illustrated by an alternate long and short dashed line, and the position of the light beam at the timing t2 is illustrated by an alternate long and two short dashed line. Specifically, at the timing t1, the light beam L50 is reflected at the position of the movable reflecting mirror 66(t1), and irradiated as a light beam L65(t1) onto the point P(t1) of the hologram recording medium 46. On the other hand, at the timing t2, the light beam L50 is reflected at the position of the movable reflecting mirror 66(t2) (the illustrated movable reflecting mirror 66(t2) is the movable reflecting mirror 66(t1) after it moved), and irradiated as a light beam L65(t2) onto the point P(t2) of the hologram recording medium 46.

In the drawing, for convenience, only scanning modes at the two timings t1 and t2 are shown, however, in actuality, in the period from the timing t1 to t2, the light beam L65 moves parallel in the left-right direction in the drawing and the irradiation position of the light beam L65 on the hologram recording medium 46 gradually moves from the point P(t1) to P(t2) in the drawing. Specifically, in the period from the timing t1 to t2, the irradiation position of the light beam L65 is scanned from the point P(t1) to P(t2) on the hologram recording medium 46. Here, an example in which the light beam L65 is moved parallel in a one-dimensional direction (the left-right direction in the drawing) is described, and of course, by providing a mechanism that moves the light beam L65 parallel in a direction perpendicular to the paper surface of the drawing as well (for example, a mechanism including a reflecting mirror disposed on the XY stage), the light beam can be moved parallel in two-dimensional directions.

Here, the light beam L65 is scanned so as to become always parallel to the reference light Lref used in the creating process shown in FIG. 34, so that at each irradiation position on the hologram recording medium 46, the light beam L65 functions as correct illumination light for reproduction Lrep for reproducing a hologram recorded there.

For example, at the timing t1, the reproduction image 35 of the scatter plate 30 is produced by diffracted light L46(t1) from the point P(t1), and at the timing t2, the reproduction image 35 of the scatter plate 30 is produced by diffracted light L46(t2) from the point P(t2). Of course, in the period from the timing t1 to t2, by diffracted lights from the respective positions onto which the light beam L65 is irradiated, the reproduction image 35 of the scatter plate 30 is also produced in the same manner. Specifically, as long as the light beam L65 is scanned to move parallel, whichever position on the hologram recording medium 46 the light beam L65 is irradiated onto, the same reproduction image 35 is produced at the same position by diffracted light from the irradiation position.

Finally, the illumination apparatus 110 shown in FIG. 35 can carry out illumination by utilizing reproduction light of the reproduction image 35 as illumination light in the same manner as in the illumination apparatus 100 shown in FIG. 9. In conclusion, in the present invention, an image of the scatter plate is recorded as a hologram on a hologram recording medium by using reference light irradiated along an optical path, and by the light beam scanning device, a light beam is scanned so that the irradiation direction of the light beam onto the hologram recording medium is along (optically conjugate toward) the optical path of the reference light.

<4-7> Utilization of Microlens Array

In the embodiments described above, a hologram recording medium on which a hologram image of the scatter plate 30 is recorded is prepared, a coherent light is scanned on the hologram recording medium, and obtained diffracted light is utilized as illumination light. Here, a description is given of a modification utilizing a microlens array instead of the hologram recording medium.

Figure 36:
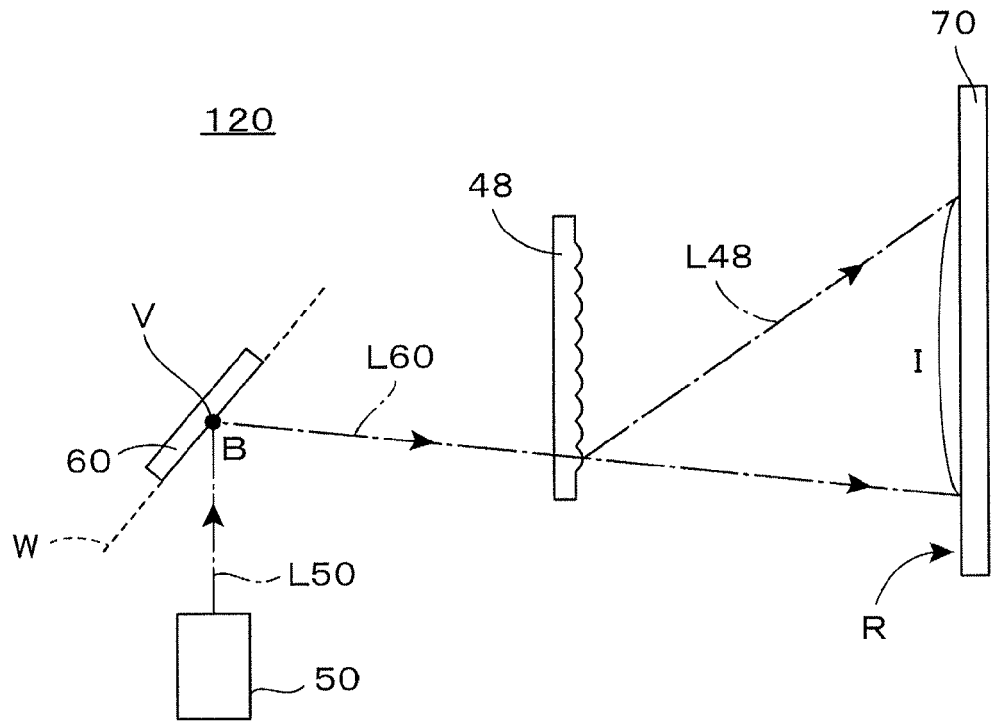
FIG. 36 is a side view showing a basic configuration of an illumination apparatus 120 according to another modification of the present invention.

FIG. 36 is a side view of the modification utilizing a microlens array. An illumination apparatus 120 according to the present modification includes a microlens array 48, a coherent light source 50, and a light beam scanning device 60. The coherent light source 50 generates a coherent light beam L50 as in the embodiments described above, and specifically, a laser light source can be used.

The light beam scanning device 60 scans the light beam L50 generated by the coherent light source 50 as in the embodiments described above. More specifically, the light beam scanning device has a function of bending the light beam at the scanning origin B and irradiating it onto the microlens array 48, and in addition, carries out scanning by changing the bending mode of the light beam L50 with time so that the irradiation position of the light beam L60 on the microlens array 48 changes with time.

On the other hand, the microlens array 48 is an optical element consisting of a collection of a large number of independent lenses. Each of the independent lenses constituting the microlens array 48 has a function of refracting light incident from the scanning origin B and forming an irradiation region I on the light receiving surface R of the illuminating object 70. Further, the independent lenses are configured so that all irradiation regions I formed by the independent lenses become the same common region on the light receiving surface R. As a microlens array having this function, for example, a microlens array called "fly-eye lens" is commercially available.

Figure 37:
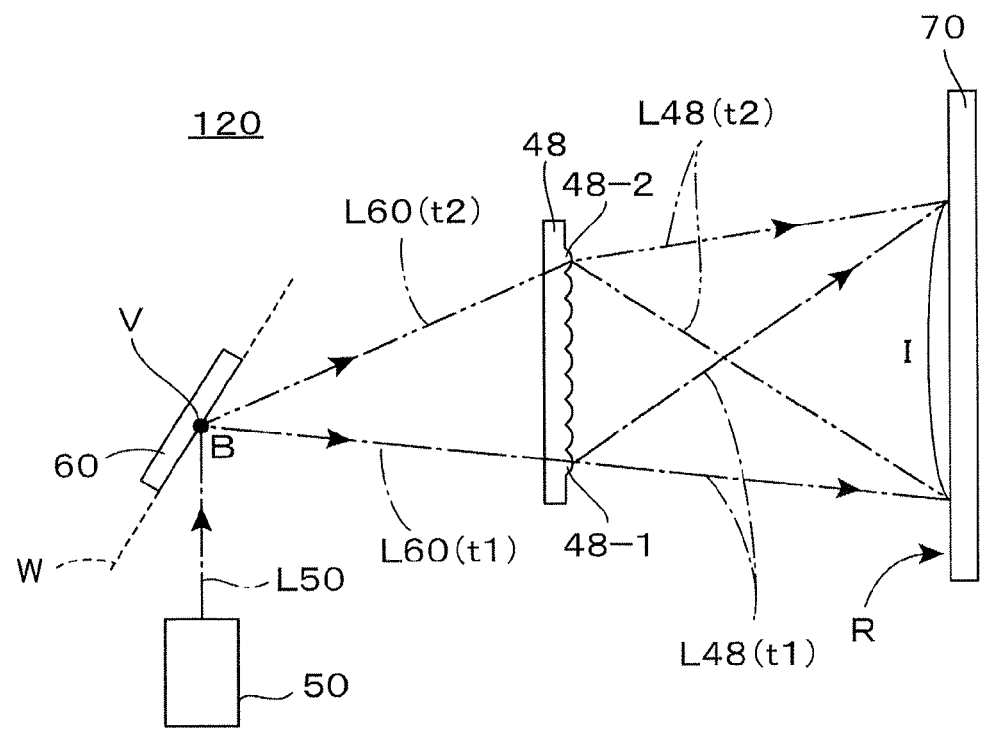
FIG. 37 is a side view showing an operation principle of the illumination apparatus 120 shown in FIG. 36.

FIG. 37 is a side view showing an operation principle of the illumination apparatus 120 shown in FIG. 36. Also here, for convenience of description, the bending mode at the timing t1 of the light beam L60 is illustrated by an alternate long and short dashed line, and the bending mode at the timing t2 is illustrated by an alternate long and two short dashed line. Specifically, at the timing t1, the light beam L50 is bent at the scanning origin B, and incident as a light beam L60(t1) on the independent lens 48-1 positioned on the lower side of the microlens array 48. This independent lens 48-1 has a function of expanding the light beam incident from the scanning origin B and irradiating the light beam onto a two-dimensional irradiation region I on the light receiving surface R of the illuminating object 70. Therefore, on the light receiving surface R, the irradiation region I is formed as illustrated.

At the timing t2, the light beam L50 is bent at the scanning origin B, and incident as a light beam L60(t2) on the independent lens 48-2 positioned on the upper side of the microlens array 48. This independent lens 48-2 has a function of expanding the light beam incident from the scanning origin B and irradiating the light beam onto the two-dimensional irradiation region I on the light receiving surface R of the illuminating object 70. Therefore, at the timing t2, the irradiation region I is also formed on the light receiving surface R as illustrated.

In the drawing, only operation states at the timings t1 and t2 are shown, however, in actuality, in the period from the timing t1 to t2, the bending direction of the light beam smoothly changes, and the irradiation position of the light beam L60 on the microlens array 48 gradually moves from the lower side to the upper side in the drawing. Specifically, in the period from the timing t1 to t2, the irradiation position of the light beam L60 is scanned up and down on the microlens array 48. Of course, when a microlens array 48 including a large number of independent lenses arrayed two-dimensionally is used, the light beam is scanned on this two-dimensional array by the light beam scanning device 60.

Due to the above-described properties of the microlens array 48, whichever independent lens the light beam L60 is incident on, the two-dimensional irradiation region I formed on the light receiving surface R is common. Specifically, regardless of the light beam scanning state, the same irradiation region I is always formed on the light receiving surface R, and the same illumination spot is formed. In fact, in practical use, even when the irradiation regions I generated by the independent lenses are not completely the same but slightly deviate from each other, this does not pose a problem as an illumination apparatus. In this case, the position of the illumination spot changes with time, however, by setting the scanning speed of the light beam scanning device 60 to be higher to some extent, the change in illumination spot position is not recognized and is just felt as slight blurring of the contour to a human.

Finally, in the case of the illumination apparatus 120 shown herein, the light beam scanning device 60 has a function of irradiating the light beam L60 onto the microlens array 48 and scanning the light beam L60 so that the irradiation position of the light beam L60 on the microlens array 48 changes with time. On the other hand, each of the independent lenses constituting the microlens array 48 has a function of refracting light irradiated from the light beam scanning device 60 and forming the irradiation regions I on the light receiving surface R, and is configured so that all irradiation regions I formed by the independent lenses become substantially the same common region on the light receiving surface R.

In this illumination apparatus 120, the coherent light source 50 is also used, so that the apparatus exerts an extremely novel illuminating effect on observers. Specifically, due to chromaticity of coherent light, monochromic surface illumination with extremely high chromatic purity is realized. In addition, due to the directionality of coherent light, an illumination spot with a clear contour can be formed. Further, by using a laser light source with high light conversion efficiency, illumination with high brightness at low power consumption is realized. Moreover, as in the illumination apparatus according to the basic embodiment described above, the incidence angle of light to be irradiated onto each portion of the light receiving surface R is multiplexed by time, so that occurrence of speckles is reduced.

<4-8> Utilization of Optical Diffusing Element

An example of an illumination apparatus configured by using a hologram recording medium on which a hologram image of the scatter plate 30 is recorded is described above as a basic embodiment, and in <4-7> described above, an example of an illumination apparatus configured by using a microlens array instead of a hologram recording medium is described. In these illumination apparatuses, ultimately, the hologram recording medium and the microlens array perform the role of an optical diffusing element having a function of forming irradiation regions on a light receiving surface by diffusing an incident light beam. In addition, the optical diffusing element has a feature that the formed irradiation regions become the same common region on the light receiving surface regardless of the incidence positions of the light beam. Therefore, to configure an illumination apparatus according to the present invention, the above-described hologram recording medium and microlens array do not necessarily have to be used, and generally, the illumination apparatus can be configured by using an optical diffusing element having the above-described feature.

In conclusion, the illumination apparatus according to the present invention can be essentially configured by using a coherent light source that generates a coherent light beam, a light beam scanning device that carries out beam scanning by controlling either or both of the direction and position of the light beam, and an optical diffusing element that diffuses the incident light beam and emits it.

Here, the light beam scanning device is sufficient as long as it has a function of guiding a light beam generated by the coherent light source toward the optical diffusing element and scanning the guided light beam so that the incidence position of the light beam on the optical diffusing element changes with time. The optical diffusing element is sufficient as long as it has a function of forming irradiation regions on a light receiving surface by diffusing the incident light beam, and be configured so that the formed irradiation regions become substantially the same common region on the light receiving surface regardless of incidence positions of the incident light beam.

INDUSTRIAL APPLICABILITY

An illumination apparatus according to the present invention can be utilized for purposes of providing illumination light in various environments both outdoors and indoors. In particular, coherent light is used as illumination light, so that illumination excellent in chromaticity and directionality is realized, and is suitable for illumination for interior accessories in restaurants and hotels, etc. In addition, the illumination is excellent in chromaticity, so that it can also be suitably utilized as illumination for color evaluation. Further, the illumination apparatus of the present invention is applicable not only to equipment whose direct purpose is illumination but also various equipment requiring some illumination light as an illumination light providing means. For example, the illumination apparatus according to the present invention is also applicable to general image display apparatuses, projectors, and scanners, etc.

The invention claimed is:

1. An illumination method using a coherent light source, comprising:
    a preparation step of creating a hologram recording medium (45, 46, 85) by recording an image (35) of a scatter plate (30) as a hologram on a recording medium (40, 80); and
    an illumination step of irradiating a coherent light beam (L60) onto the hologram recording medium (45, 46, 85), and scanning the light beam (L60) on the hologram recording medium (45, 46, 85) so as to change both an irradiation position and an irradiation direction of the light beam on the hologram recording medium with time, wherein
    in the preparation step, coherent illumination light (L12) is irradiated onto the scatter plate (30), scattered light (L30) obtained from the scatter plate (30) is used as object light, and irradiated onto the recording medium (40, 80) along an optical path, coherent light (L23, Lref) with a same wavelength as a wavelength of the illumination light (L12) is used as reference light, and interference fringes formed by the object light and the reference light are recorded on the recording medium (40, 80) to create the hologram recording medium (45, 46, 85),
    in the illumination step, a light beam (L60, L65) with a wavelength capable of reproducing the image (35) of the scatter plate scans toward an irradiation position on the hologram recording medium (45, 46, 85) by passing through an optical path along the optical path of the reference light (L23, Lref), and
    reproduction light of the image (35) of the scatter plate (30) obtained from the hologram recording medium (45, 46, 85) is used as illumination light.

2. The illumination method using a coherent light source according to claim 1, wherein
    in the preparation step, by condensing a light flux of substantially parallel coherent light by using a convex lens (23, 25) having a focal point on a position of a convergence point, reference light that three-dimensionally converges on the convergence point or reference light that three-dimensionally diverges from the convergence point is produced, and by using the produced reference light, interference fringes are recorded.

3. The illumination method using a coherent light source according to claim 2, wherein
    a computer generated hologram is recorded on the hologram recording medium (45, 46, 85) by carrying out the process of the preparation step by a simulation operation using a virtual scatter plate (30').

4. The illumination method using a coherent light source according to claim 3, wherein
    a model including a large number of point light sources (D) aligned in a grid pattern on a plane is used as the virtual scatter plate (30').

5. The illumination method using a coherent light source according to claim 1, wherein
    in the preparation step, by condensing a light flux of substantially parallel coherent light on a condensing axis by using a cylindrical lens (24) having a central axis parallel to the condensing axis, reference light that two-dimensionally converges on a point on the condensing axis or reference light that two-dimensionally diverges from a point on the condensing axis is produced, and by using the produced reference light, interference fringes are recorded.

6. The illumination method using a coherent light source according to claim 5, wherein
    a computer generated hologram is recorded on the hologram recording medium (45, 46, 85) by carrying out the process of the preparation step by a simulation operation using a virtual scatter plate (30').

7. The illumination method using a coherent light source according to claim 6, wherein a model including a large number of point light sources (D) aligned in a grid pattern on a plane is used as the virtual scatter plate (30').

8. The illumination method using a coherent light source according to claim 1, wherein a computer generated hologram is recorded on the hologram recording medium (45, 46, 85) by carrying out the process of the preparation step by a simulation operation using a virtual scatter plate (30').

9. The illumination method using a coherent light source according to claim 8, wherein a model including a large number of point light sources (D) aligned in a grid pattern on a plane is used as the virtual scatter plate (30').

* * * * *